US006954757B2

United States Patent
Zargham et al.

(10) Patent No.: US 6,954,757 B2
(45) Date of Patent: Oct. 11, 2005

(54) FRAMEWORK, ARCHITECTURE, METHOD AND SYSTEM FOR REDUCING LATENCY OF BUSINESS OPERATIONS OF AN ENTERPRISE

(75) Inventors: Bahman Zargham, Sunnyvale, CA (US); Gregory Battas, Indianapolis, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 09/948,927

(22) Filed: Sep. 7, 2001

(65) Prior Publication Data

US 2002/0107957 A1 Aug. 8, 2002

Related U.S. Application Data

(60) Provisional application No. 60/266,003, filed on Feb. 2, 2001.

(51) Int. Cl.[7] .............................................. G06F 17/30
(52) U.S. Cl. ......................... 707/101; 707/100; 707/10; 707/6; 709/224; 709/206; 717/102
(58) Field of Search ................................ 707/100, 101, 707/104, 10, 6; 709/224, 206; 717/102, 104

(56) References Cited

U.S. PATENT DOCUMENTS

| | | | | |
|---|---|---|---|---|
| 6,314,531 B1 | * | 11/2001 | Kram | 714/38 |
| 6,550,057 B1 | * | 4/2003 | Bowman-Amuah | 717/126 |
| 6,591,278 B1 | * | 7/2003 | Ernst | 707/104.1 |
| 6,601,233 B1 | * | 7/2003 | Underwood | 717/102 |
| 2002/0165903 A1 | * | 11/2002 | Zargham et al. | 709/202 |
| 2003/0220860 A1 | * | 11/2003 | Heytens et al. | 705/35 |
| 2003/0220901 A1 | * | 11/2003 | Carr et al. | 707/1 |
| 2003/0229884 A1 | * | 12/2003 | Carr et al. | 717/101 |

OTHER PUBLICATIONS

Georgakopoulos et al., "Process baased service integration for zero latency supply chains in virtual enterprises", pp. 1–18.*

Recio et al., "Server I/O networks past, present, and future", ACM, pp. 163–178.*

Dharma P. Agrawal "Conference report on AIWoRC: Next Generation enterprise–virtual organizations and pervasive/mobile technologies", pp. 20–24, vol. 4, No. 2.*

Jeng et al., "An Agent based architecture for analyzing business processes of real–time enterprise", IEEE, 2003.*

Hamilton et al., "Concurrent Error recovery with near–zero latency in synthesized ASICs".*

Den, Daas C.: "Gartner '98–The Zero Latency Enterprise," Informatie, Dec. 1998, KluweBedrijfswetenschappen, vol. 40, spec. issue., pp. 60–65, XP009008657.

(Continued)

Primary Examiner—Jean M. Corrielus

(57) ABSTRACT

A framework, architecture, system and method are provided for reducing business transaction latencies thereby enabling an enterprise to run as a zero latency enterprise (ZLE). The present invention enables the enterprise to integrate its services, applications and data in real time. An enterprise running as a ZLE has a uniform global view of its past and current business transactions, including its customer interactions, internal business operations, supply chain management and more; and this uniform global view can be obtained from anywhere across the enterprise and be used for real-time decision making. Namely, an enterprise equipped to run as a ZLE is capable of integrating, in real time, its enterprise-wide data, applications, business transactions, operations and values. Consequently, an enterprise conducting its business as a ZLE exhibits superior management of its resources, operations and customer care.

62 Claims, 18 Drawing Sheets

The ZLE framework

OTHER PUBLICATIONS

Compaq Information Technologies Group, L.P., International Search Report mailed Apr. 24, 2003, Int'l. App. No. PCT/US01/28623, Int'l. Filing Date Sep. 13, 2001, pp. 1–6.

Compaq Information Technologies Group, Inc., International Search Report mailed Apr. 11, 2003, Int'l App. No. PCT/US01/28778, Int'l. Filing Date Sep. 13, 2001, pp. 1–6.

Chaudhuri S., et al.: "An Overview of Data Warehousing and OLAP Technology," Sigmod Record, vol. 26, No. 1, Mar. 1997, pp. 65–74, XP002193792.

Halle D.: "A New Marketing Game Plan," Teradata Review, vol. 2, No. 3, 1999, pp. 21–22, 24–25, XP009002119.

Sengul, S., et al.: "Building A Service Provisioning System Using The Enterprise Java Bean Framework," IEEE/IFIP Network Operations And Management Symposium The Networked Planet: Management Beyond 2000, Apr. 10–14, 2000, pp. 367–380, XP010376695.

Anonymous: "Compaq's Zero Latency Enterprise Initiative: Business at the Speed of Now," 24 x7 The Magazine of NonStop Computing by Compaq Computer Corporation, vol. 1, No. 2, Oct. 2000, pp. 1–25, XP002236415.

Shannon, T. C.: "ZLE: When you have to have in NOW," Shannon Knows Compaq, Oct. 17, 1999, pp. 1–2, XP002236416.

Voth, G. R. et al.: "Distributed application development for three-tier architectures: Microsoft on Windows DNA," IEEE Internet Computing, Mar.–Apr. 1998, vol. 2, No. 2, pp. 41–45, XP002236417.

* cited by examiner-

Two views in application and data integration

Zero Latency Enterprise model

Personalization

◆ Guest = Guest ID ⟹ Knowledge derived:

Guest - preferences
Guest - interactions
Enterprise - our products and policies
personalize based on the above FIG. 9 The ZLE framework

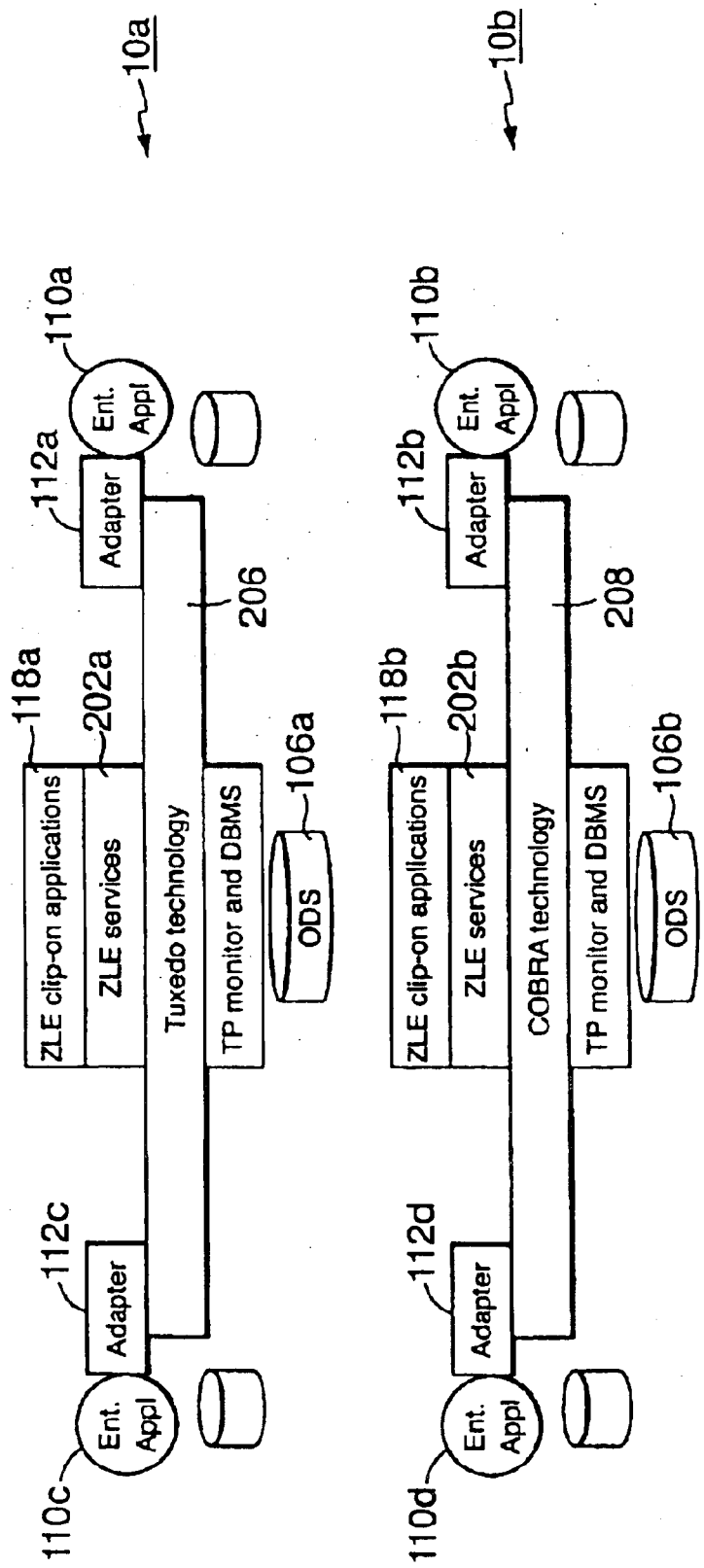
FIG. 11 The ZLE framework - built on Tuxedo / CORBA/Java technologies FIG. 12b
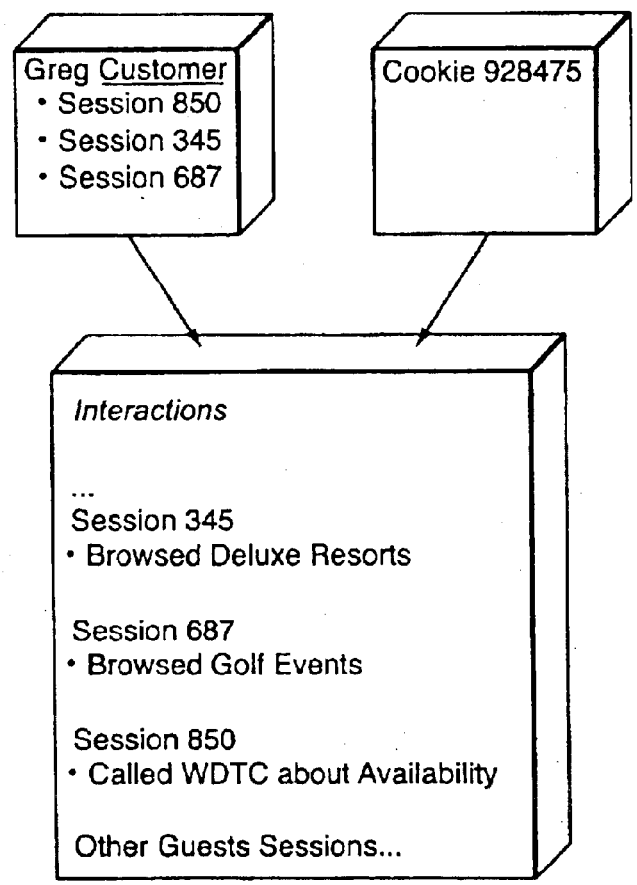
Customer ZLE
*Concentrated interactions*
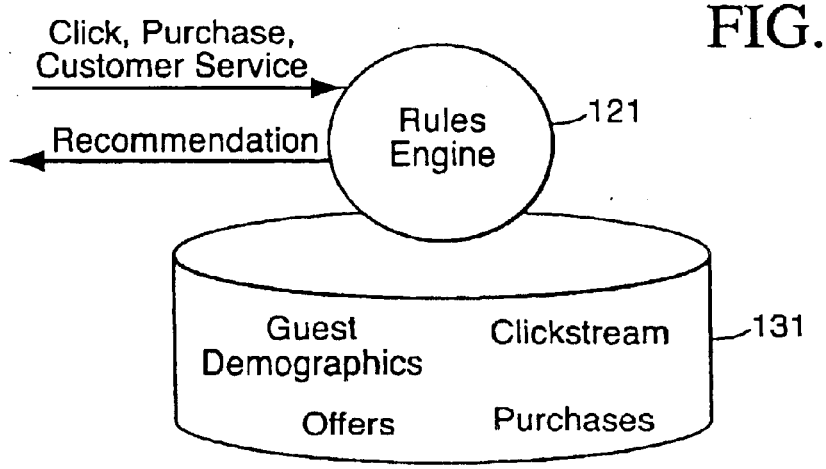
FIG. 13a

FRAMEWORK, ARCHITECTURE, METHOD AND SYSTEM FOR REDUCING LATENCY OF BUSINESS OPERATIONS OF AN ENTERPRISE

REFERENCE TO PRIOR APPLICATION

This application claims the benefit of and incorporates by reference U.S. Provisional Application No. 60/266,003 filed Feb. 2, 2001.

CROSS REFERENCE TO RELATED APPLICATION

This application is related to and incorporates by reference U.S. patent application Ser. No. 09/948,928, filed Sep. 7, 2001, entitled "Enabling a Zero Latency Enterprise." now U.S. Pat. No. 6,757,689, issued Jun. 29, 2004, and Ser. No. 10/013,091, filed Dec. 7, 2001, entitled "Zero Latency Enterprise Enriched Publish/Subscribe."

BACKGROUND OF THE INVENTION

1. Field of the Invention

This application relates to an information technology (IT) infrastructure of an enterprise, and specifically, an IT infrastructure that enables a zero latency enterprise (ZLE). The present invention enables the enterprise to integrate its services, applications and data in real time, hence the ZLE.

2. Background Art

Information technology (IT) allows valuable information to be distributed across organizations to groups of information consumers including remote employees, business partners and customers. However, organizations have large amounts of information located on disparate systems and platforms. For maintaining the desired comprehensive view of their operations, organizations need to integrate theirs systems. Then again, independent configuration for disparate industry standards and technologies makes systems integration requirements difficult to meet. Moreover, as the various business applications have diverse features and are tailored to suit the requirements of a particular domain, their integration requirements may be also difficult to meet. For example, there are significant integration requirements to make it work when integrating a customer relationship management (CRM) application to an existing system with other applications such as SAP's enterprise resource planning (ERP) software package, as the CRM is uniquely tailored to the customer care domain.

Notwithstanding, when addressing their critical information needs, organizations often resort to new best-of-the-breed applications (or solutions). To leverage their existing applications, organizations integrate their legacy applications with the new solutions, a practice known as enterprise application integration (EAI). To this end, software vendors have responded by building tools, known as EAI products, alas different tools by different vendors, to automate the integration process.

Deficiencies in integration and data sharing are indeed a difficult problem of IT environments for any enterprise. The inability of organizations to operate as one-organ, rather than separate parts, creates a challenge in information exchange and electronic commerce and results in economic inefficiencies.

With conventional solutions, organizations have been using some form of the EAI platform to integrate their application. And they have been using a different platform for integrating their data into data warehouses. Data warehouses integrate data across an organization for reporting and data mining using business intelligence tools like SAS Institute tools.

The problems with these schemes are that there is no real-time connection and interaction between the EAI and data warehousing. Moreover, with relatively static data warehouses the data warehousing cloud is used for analysis but could not participate in the current transaction or events that are happening in the organization in real time. The organization still will end up with two disjointed infrastructures that cannot leverage each other in real-time (See: FIG. 1). Accordingly the present invention addresses these and related issues.

SUMMARY OF THE INVENTION

In accordance with the purpose of the invention, as embodied and broadly described herein, the invention relates to a framework, architecture, system and method for reducing business transaction latencies and enabling an enterprise to run as a zero latency enterprise (ZLE). The present invention allows the enterprise to integrate its services, applications and data in real time. Namely, an enterprise equipped to run as a ZLE is capable of integrating, in real time, its enterprise-wide data, applications, business transactions, operations and values. Consequently, an enterprise conducting its business as a ZLE exhibits superior management of its resources, operations, supply chain and customer care.

Underpinning the superior capabilities of ZLE is an information technology (IT) infrastructure that is equipped with and using the hybrid functionality of a ZLE framework. This framework is not a single product or middle ware. Rather, it defines architecture with collection of products, tools, and services that enables, among others, the reduction of operational latencies in the enterprise. With such hybrid functionality, an enterprise running as a ZLE can route information across various enterprise applications using enterprise application integration technologies. Clearly, the ZLE framework is not just an enterprise integration platform as it can accomplish application and data integration across the enterprise. Using database extractors, database loaders and application adapters technologies, the ZLE can integrate data related to the real time operations of the enterprise into a data storage cache, also known as operational data store (ODS), and synchronize information across the enterprise using enterprise applications integration (EAI) tools. Also, with rules and synchronization policies implemented in a ZLE hub with the ODS, any updates communicated to the ZLE hub from any application across the enterprise can, via the ZLE hub, bring about information synchronization in all other applications across the enterprise, including its legacy applications. Information and updates thereof are communicated from the applications to the ZLE hub by way of adapters. Furthermore, the ZLE can provide data to business intelligence applications for analysis, and it supports decision support systems (DSS) and data mart operations as well as transactional access to up to the minute data by multiple add-on new and legacy enterprise applications.

As noted, one embodiment of the present invention is a zero latency enterprise (ZLE) framework in an information technology infrastructure of an enterprise that conducts business transactions. In relation to business transactions the enterprise experiences a plurality of events occurring in sites across the enterprise. To reduce the unintended latency in enterprise operations to zero, all organs of the enterprise need to be made aware of business events as they occur, i.e., in real time. Hence, the ZLE framework is formed with enterprise applications installed in relation to respective sites across the enterprise and enterprise application platform configured for enterprise applications integration and propagation of indicia of the events across the enterprise, in real time. The ZLE framework is additionally formed with dynamic central repository configured for real-time loads, extractions, updates and queries. The dynamic central repository aggregates information related, in real time, to the plurality of events where a real-time access to the dynamic central repository is correspondingly available for the enterprise applications. Hence, a real time coherent view of the aggregated information is available to the enterprise applications from across the enterprise via the dynamic central repository. The ZLE framework is further formed with a server executing and monitoring transactions related to the business transactions. The dynamic central repository is operatively connected to the server so that the business transactions can be conducted across the enterprise with reduced latencies.

It is noted that the ZLE framework is extensible and available and enabling the enterprise to become extensible and available as well. It is further noted that the ZLE framework defines a multilevel architecture with a hub, wherein the enterprise applications are loosely coupled to the hub and communicating therewith via adapters.

Another embodiment of the present invention is a system in the information technology infrastructure of the enterprise. The system includes enterprise applications installed in relation to respective sites across the enterprise, a ZLE core, clip-on applications tightly coupled to the ZLE core, and data mining and analysis technology operatively connected to the central dynamic real-time data warehouse. The ZLE core is configured with enterprise applications integration and propagation of information related to the events across the enterprise, central dynamic real-time data warehouse and database management, ZLE services and transaction processing and monitoring.

Access to the central dynamic real-time data warehouse and database management is correspondingly available to the enterprise applications. A real time coherent view of the information is available to the enterprise applications from across the enterprise through the central dynamic real-time data warehouse and database management. The ZLE services are coupled with the central dynamic real-time data warehouse and database management and are operatively connected with the enterprise applications. The transaction processing and monitoring is relative to the central real-time data warehouse and database management so that the business transactions can be conducted across the enterprise with reduced latencies. The transaction processing and monitoring at the ZLE core is implemented in a server environment that includes a server or a server cluster.

The system has a multilevel architecture in which the enterprise applications and loosely coupled to the ZLE core via corresponding adapters. One feature of the system is that the central dynamic real-time data warehouse and database management reduces data dependency between the enterprise applications. Another feature is that new enterprise application can be added, wherein the central dynamic real-time data warehouse and database management provides a historic account of events that can be used by the newly added enterprise application.

In yet another embodiment of the present invention, the method for reducing latencies of business transactions enables the enterprise to run as a ZLE. The method includes instantiating enterprise applications installed in relation to respective sites across the enterprise. The method also includes performing a number of steps at a ZLE core within the IT infrastructure. These method steps include: instantiating enterprise applications integration and propagation of information related to the events across the enterprise; creating the central dynamic real-time data warehouse and database management; instantiating ZLE services that are coupled with the central dynamic real-time data warehouse and database management and operatively connected with the enterprise applications; providing feedback capability supported by the dynamic real-time data warehouse and database management and creating transaction processing and monitoring relative to the central dynamic real-time data warehouse so that the business transactions can be conducted across the enterprise with reduced latencies. The method further includes instantiating clip-on applications which are tightly coupled to the ZLE core; and instantiating data mining and analysis that is operatively connected to the central dynamic real-time data warehouse.

Advantages of the invention will be understood by those skilled in the art, in part, from the description that follows. Advantages of the invention will be further realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

FIG. 11 illustrates a ZLE framework with a different application server that can be based on Tuxedo, CORBA or Java technologies.

FIGS. 12a–c illustrate lookup data that includes data not modified by transactions or interactions (i.e., an historic account of prior activity). FIG. 12a also illustrates how the interaction manager and rules engine can cooperate to produce a prompt or response in connection with a particular type of business.

FIGS. 13, and 13a–d illustrate clip-on applications such as for fraud detection, customer interaction and personalization, customer data management, narrowcasting, and so on. FIG. 13a further illustrates how the interaction manager and rules engine can cooperate to produce a prompt or response in connection with a particular type of business.

DETAILED DESCRIPTION OF THE INVENTION

Figure 2:
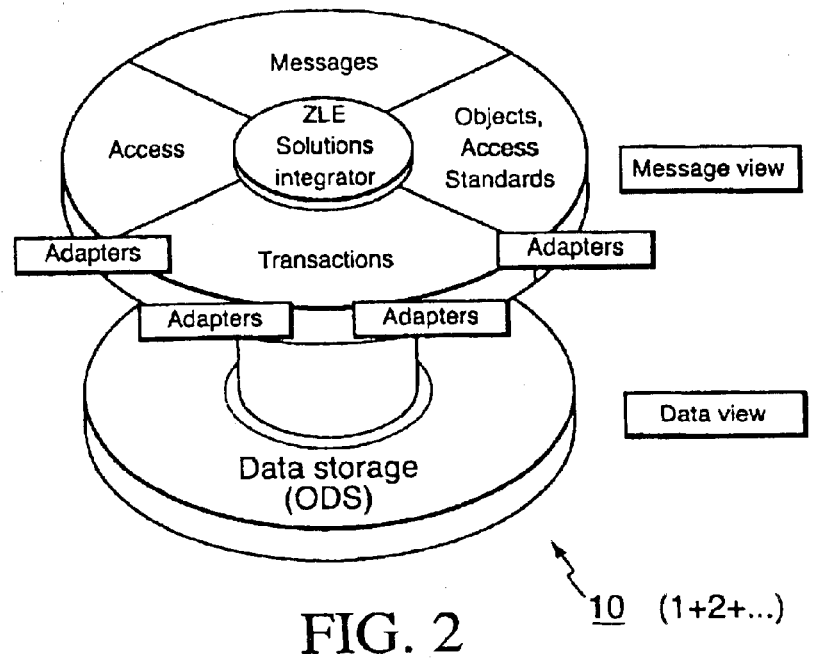
FIG. 2 illustrates the zero latency enterprise (ZLE) model.

The present invention relates to information technology (IT) and, specifically, to reducing business operations latencies in an enterprise through an adaptive IT infrastructure that enables a zero latency enterprise (ZLE). As a functional and architectural strategy, the invention contemplates a ZLE framework with a hybrid functionality that is fashioned by the merger of enterprise application integration (EAI), dynamic real-time operational data warehousing, transaction processing and monitoring, data mining and analysis and a feedback mechanism. (See: FIG. 2 for the ZLE model). The feedback mechanism provides an automatic feedback of results, produced from the data mining and analysis, to the business transaction paths. The invention further contemplates the ZLE architecture, a multilevel architecture that supports the ZLE framework. This scheme enables the enterprise to integrate its services, applications and data in real time. In other words, it enables the enterprise to run as a ZLE.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

The meaning imparted to the terms below and throughout this paper is intended not as a limitation but merely to convey character or property relevant to the present invention. Where the terms have a special meaning or a meaning that is inapposite to accepted meaning in the art, the value of such meaning is not intended to be sacrificed to well-worn phrases or terms.

Enterprise—refers to any organization, including a business organization, its subsidiaries, departments, divisions, sections, sectors, groups, branches, channels or like parts; and it can include any partners, affiliates and associates of the organization. An organization includes its resources such as one or more people, systems, databases, policies and more.

Enterprise-wide or across the enterprise—refers, depending on the context, to anywhere within or about the enterprise, in all parts of the enterprise, all over the enterprise, all around the enterprise, across all enterprise products, services, and channels, between any sites of or associated with the enterprise, or at any site of or associated with the enterprise.

Extensible—refers to any one or the combination of scalable, extendable and expandable. Scalability relates to size, extendibility relates to volume and expandability relates to capacity. For example, the ZLE framework and architecture are extensible. With the ZLE framework and architecture, an enterprise is also extensible.

Scalable—refers to the ability to improve performance by extending the size of an enterprise, a system or an element thereof. Scalability of an enterprise enables it to run as a virtual enterprise (i.e., performing the functions of an entity beyond what is really there). For example, scalability allows an enterprise with exhausted manufacturing capacity to push production overflows to its partners or affiliates. Namely, running as a virtual enterprise, the enterprise can extend its existing capacity through manufacturing-on-demand by its business partners; and the partners have visibility to the enterprise so that they can stay informed and be prepared to respond. Scalability of a system involves adding components to the system. Scalability of the system allows sizing it for better performance when volume of business transactions increases.

Available—refers generally to an enterprise or system 'being there' even in the face of failure or absence of a part thereof. For example, an enterprise is available when it continues to conduct its business unimpeded even if a part of the enterprise is shut down. A system is available when it continues processing transactions even if it suffers a component failure.

Real-time—refers to immediately or almost immediately; or the actual time, nearly the actual time or within seconds from the actual time during which an event or a process transpires, or pertains to the performance of a computation or other action nearly or at the actual time of a related event or process so as to render an instantaneous, up-to-the-second or up-to-the-minute result therefrom.

Zero Latency—refers to real-time or substantially real time. In terms of a system, zero latency is substantially no delay between the desired and actual response time. In the context of an enterprise, zero latency is about real-time or near real-time operations, processing and application of information to achieve a competitive advantage, hence the term zero-latency enterprise (ZLE). As will become evident from the description herein, in the context of the present invention, the term 'ZLE' defines a broader term than the conventional ZLE term. And, to properly distinguish it from the conventional term, one might use the term Compaq ZLE™ (the present invention was developed at Compaq Computer Corporation in Houston Tex.). However, to simplify the discussion herein, the term 'ZLE' is used instead.

Coherent view—refers to substantial congruity of the views from any part of the enterprise, or an enterprise-wide view of information, such as data, business transactions and their status, as well as an historic account thereof, that is consistent throughout the enterprise regardless from where in the enterprise the view is obtained. The View of information can include access for loads, extractions and queries.

Loosely coupled applications—refers to applications that can function as stand-alone applications and that when integrated with the ZLE framework are operationally independent and not relying on each other for obtaining information although they share that information. The information is accessible by the loosely coupled applications from a shared operational data store (ODS) so that data dependencies between requesting and responding applications are removed.

Tightly coupled applications—refers to applications that are not stand-alone and are tightly integrated into the ZLE framework. Tightly integrated functionality—e.g., event capture, data extraction, rules, workflow, message transports and transformations—becomes part of the ZLE core functionality.

Docking—refers to interfacing, integrating or adding (e.g., adding applications or solutions that extend the IT infrastructure functionality and, in turn, that of the enterprise).

Bulk data—refers to data in mass or at least in a cluster or block.

Customer—referred to also as consumer, client, visitor or guest, is any entity, individual, or organization that can receive and consume a value. In a system sense, a customer can be another system or application (e.g., an enterprise application is an 'end-customer' of the ZLE core as will be explained below).

Value—refers to any service, item for consumption, resource, product, creation, knowledge, information, action, etc. produced by or in association with the enterprise, internally or externally. A value is typically produced for the benefit of the customer.

Business—refers to any character, undertaking or functionality of an organization, be it a commercial business or any other type of organization (e.g., a commercial conglomerate, global charitable organization, governmental agency, military organization, a local agency, such as law enforcement or emergency response, with affiliation to other local agencies, and more).

Business transaction—refers to any operation or process associated with the business. A business transaction can be one or a series of business transactions, discrete or related to each other. A business transaction can be single or multi-phased, short or ongoing.

Event—refers, depending on the context, to an event occurring anywhere across the enterprise in the course of conducting the business of the enterprise or an event occurring in any part of the IT infrastructure of the enterprise upon commencement, in response to, during or after completion of a business transaction. One type of event can produce the other or can occur in combination with the other. Namely, an event can be any commencement or completion of a business transaction, any state change of a business transaction, any data entry or data change associated with the business or business transaction, any inquiry or outcome associated with a business transaction and more. An event may produce a result, and the result, if any, may itself be an event. An event may unlock or prompt the commencement of one or more business transactions. An event may lock or prompt the ending of one or more business transactions. The locking or unlocking may also be events. An event may be a single occurrence or a series of events. Several examples can be provided to illustrate the above. In one example, an event can be a customer providing a new address or a 'yes' answer to a query about a new address. In a second example, an event and a result, which is a 'notable' event, can be the recording of a new prescription at a local pharmacy and prompting notification about a new drug interaction related to the prescription from somewhere else. A third example of an event involves an on-line order of a gift certificate somewhere in the country for a recipient that opened a gift registry account in a store somewhere else. In a fourth example involving a series of events a disaster alert is followed by hazardous chemicals data associated therewith. A fifth example involving a series of events can be an attempt to return merchandise almost immediately followed by a fraud alert or a credit status change. Finally, in a sixth example an event can be an inventory-level change for an item in a data warehouse or production shop.

Indicia—refers to any detectable thing associated with an event, including any information related to the event. The information can contain one or a combination of data, transaction state(s), look-up data (an historic account) and the like. It is noted that the occurrence of an event can be detected by capturing the indicia of its occurrence.

Transaction—refers to a collection of operations on the state of an application. A transaction is typically triggered by a request or input message that prompts an operation. A transaction trigger may includes one or any combination of event, condition and action resulting from the transaction (operation). An action can itself be an event or a cascade of events.

Application—refers to a program or software embodied in a computer readable medium and including computer readable program-code that causes a computer to perform a certain task. An application can spawn a transaction, and preferably a plurality of concurrent transactions.

Figure 3:
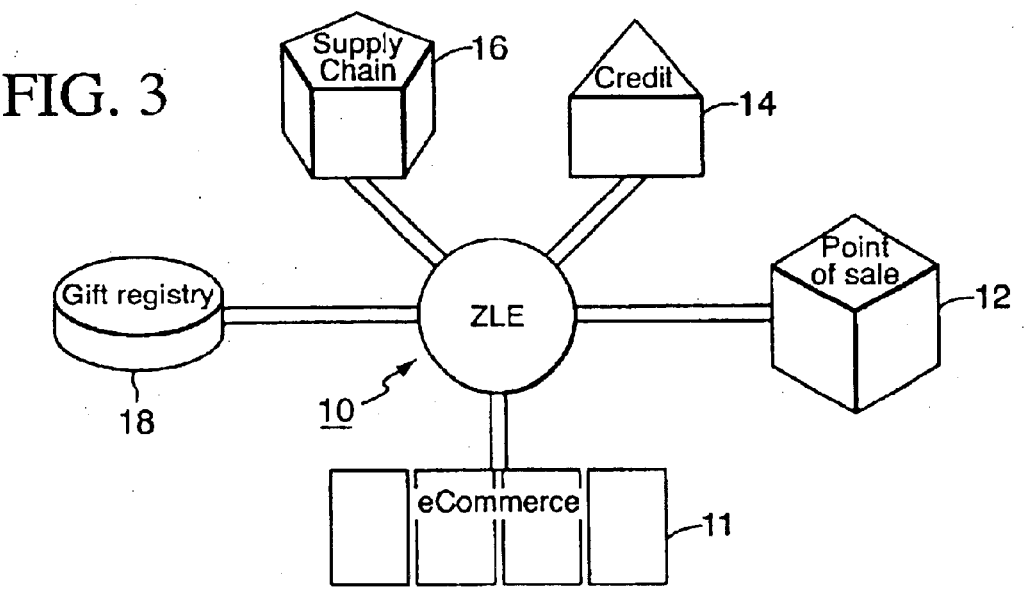
FIG. 3 describes a commercial business with its associated service connections.

Services—refers to, in one sense, to enterprise services provided in the course of conducting the enterprise business (See, e.g., FIG. 3 which describes a commercial business with its associated service connections). In terms of the IT infrastructure, the term 'services' refers to any applications that enable the enterprise to run as a ZLE by adding functionality to the IT infrastructure. In the context of the ZLE architecture 'services' can be one or any combination of applications that provide integration services, ZLE native services, core ISV services (ISV-independent solution providers), unified rules services, workflow services, message transformation services, extraction, transformation and load (ETL) service and the like. 'ZLE services' are core services and capabilities, where core services include native services and core ISV services. Loosely coupled applications can be consumers or clients of such services.

Central repository—refers to a sharable unified capacity such as the operational data store (ODS) with a relational database management system (RDBMS) in the ZLE framework as defined herein. Although a central repository can be in a single physical device or located in a single physical location, the central repository may be configured in a distributed storage system that is nonetheless accessible from across the enterprise.

As mentioned, the present invention was developed at Compaq Computer Corporation of Houston Tex., and it relates to enterprise information technology infrastructure. The present invention provides Compaq ZLE framework and architecture of an information system as well as methods for enabling an extensible zero-latency enterprise with an extensible information technology infrastructure.

Although it would be more accurate to use the term Compaq ZLE™, the term ZLE is used instead for simplicity. For further simplicity, a ZLE enterprise equipped with IT infrastructure configured in accordance with the present invention is referred to in short as ZLE or enterprise running as a ZLE.

ZLE: Overview

Figure 5:
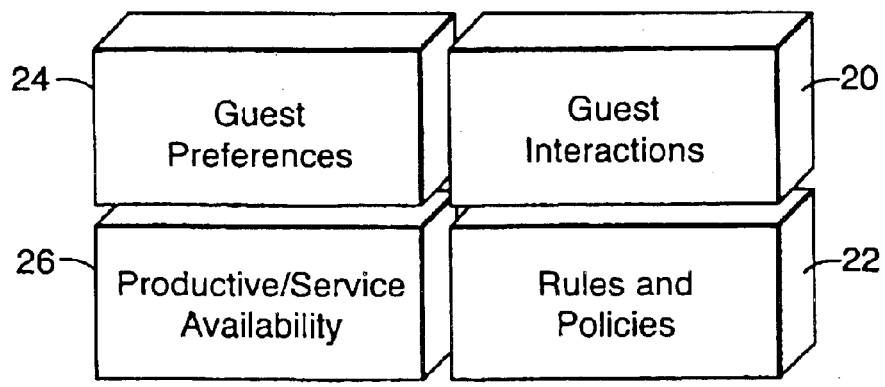
FIG. 5 illustrates how an enterprise, running as a ZLE, can conduct instant, personalized marketing (based on known or knowable customer preferences) scored and fine-tuned in real time while the customer is engaged.
Figure 4:
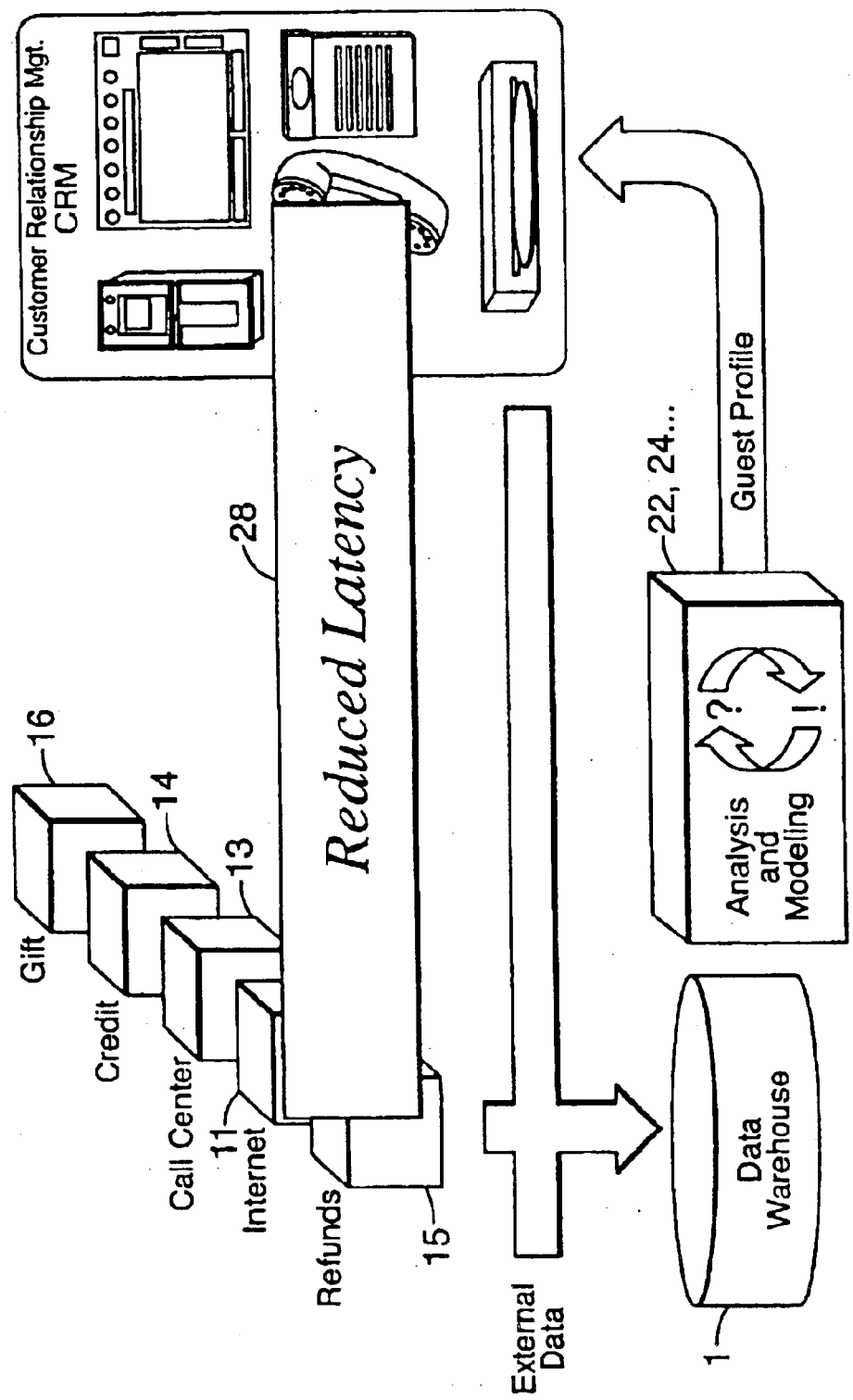
FIG. 4 shows the reality of latencies in operations and in interactions with and responses to consumers, which prompted enterprises to seek solutions for reducing latencies.

First, the vision—with zero latency framework, an enterprise can achieve coherent operations, efficient economics and competitive advantage. This is in view of the reality of e-commerce, that prompted enterprises to change their business models and to integrate e-commerce with other business models. Moreover, as shown in FIG. 4, the reality of latencies in operations and in interactions with and responses to consumers prompted enterprises to seek solutions for reducing latencies. Notably, what is true for a single system is also true for an enterprise—reduce latency to zero and you have an instant response. In an enterprise running as a ZLE, there can be enterprise-wide recognition and capturing of business events that can immediately trigger appropriate actions across all other parts of the enterprise and beyond. Along the way, the enterprise gains real-time access to a real-time, consolidated view of the its operations and data from anywhere across the enterprise, and operational inconsistencies are thus eliminated. The entire enterprise can become more responsive and competitive via a unified, up-to-the-second view of individual customer interactions with any part(s) of the enterprise, their transactions, and their behavior (See, again FIG. 3). Moreover, as FIG. 5 illustrates, an enterprise running as a ZLE and using its feedback mechanism can conduct instant, personalized marketing (based on known or knowable customer preferences 24) scored and fine-tuned in real time while the customer is engaged 20. This result is possible because of the real-time access to the customer's profile (e.g., 24) and enterprise-wide rules and policies 22 (while interacting with the customer 20). What is more, a ZLE achieves faster time to market for new products and services 26, reduced exposure to fraud, customer attrition, and other business risks. In addition, an enterprise running as a ZLE has the tools for managing its rapidly evolving resources (e.g., workforce) and business processes.

Figure 6:
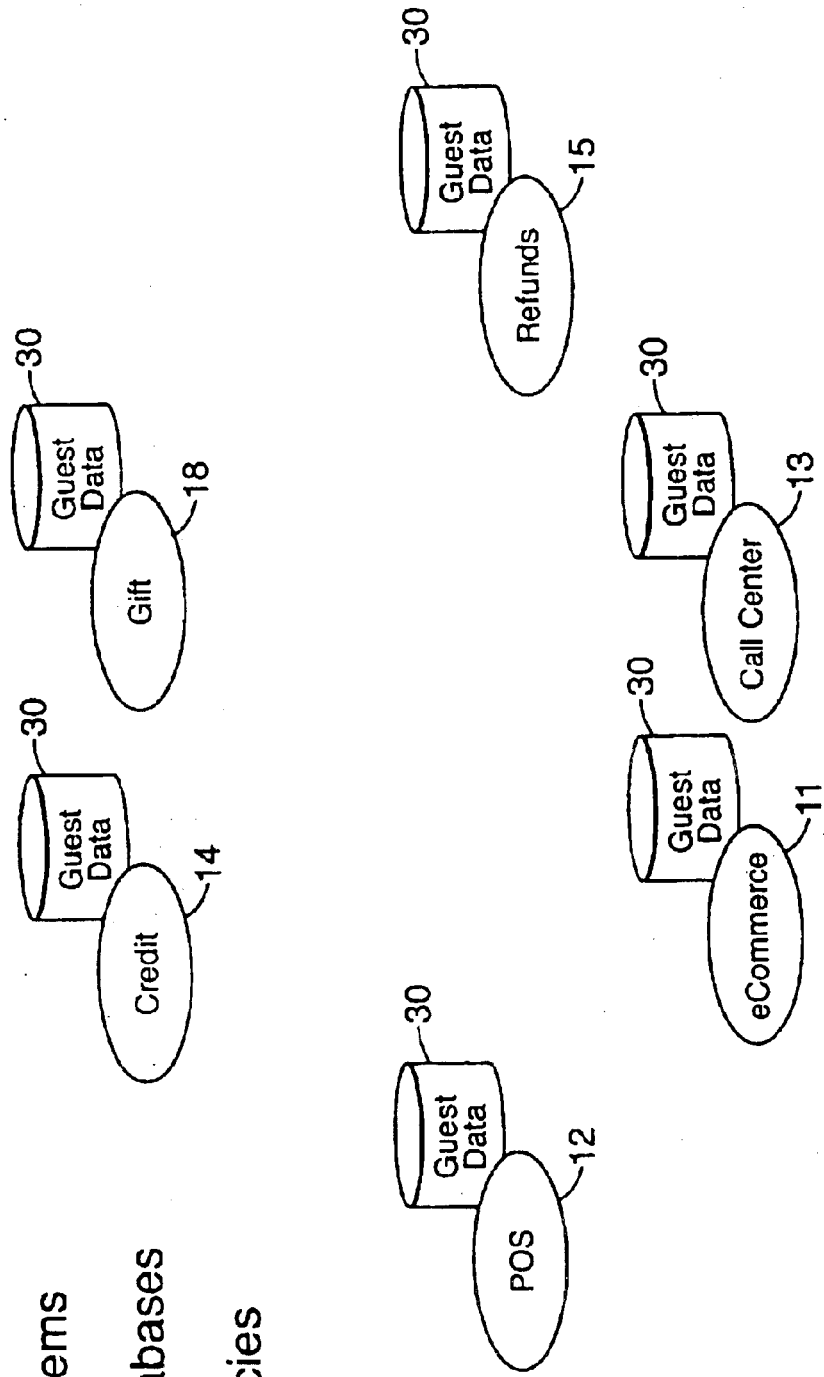
FIG. 6 is an example of a retail organization.
Figure 7:
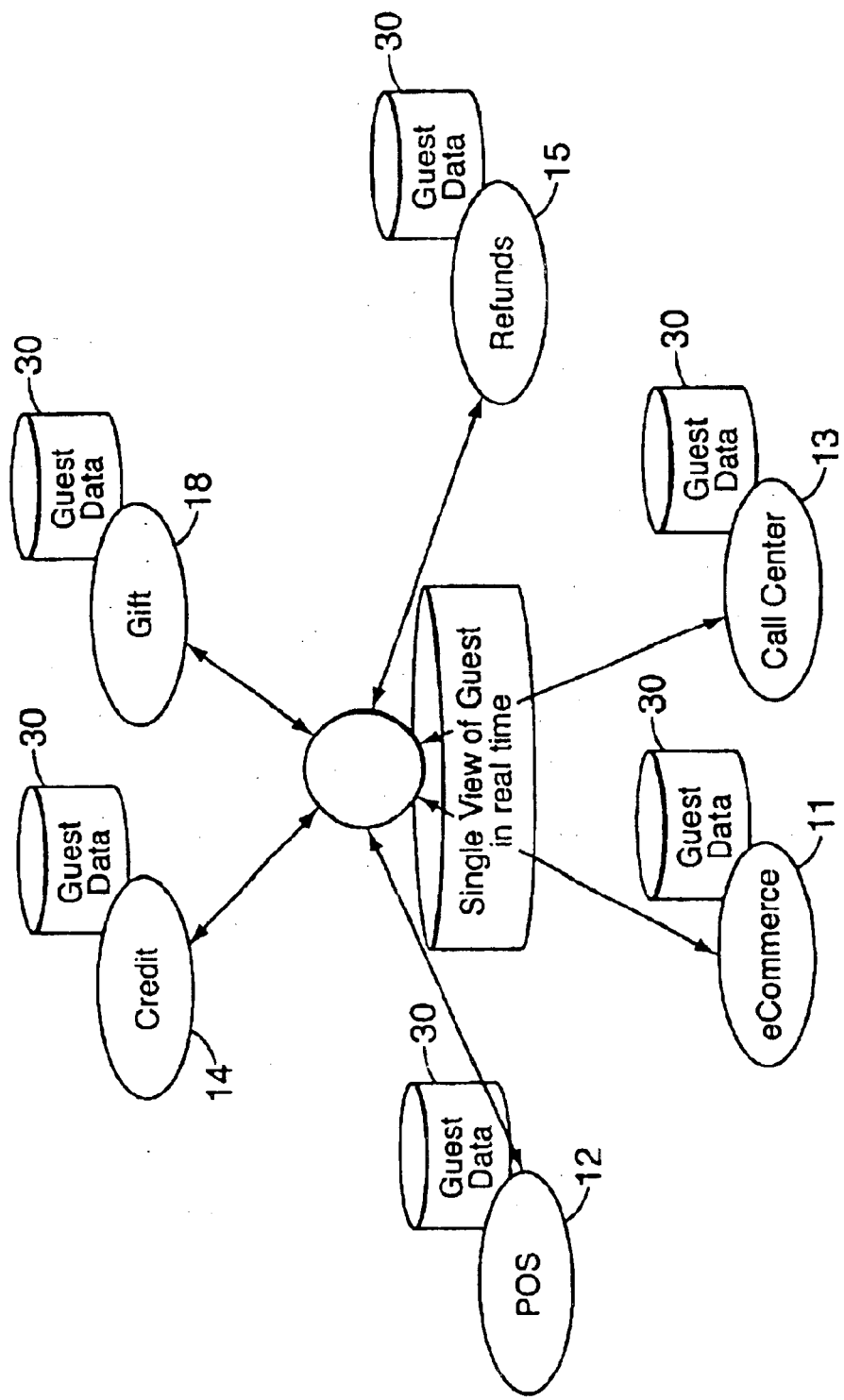
FIG. 7 shows a ZLE with all its enterprise customer contact sites (including systems and applications) integrated, responsive and personal.

For example, in a retail organization such as the one shown in FIG. 6, the resources include people, systems, databases and policies. An enterprise running as a ZLE can improve its business and gain competitive edge by managing the evolution of its resources. As shown in FIG. 7, in a ZLE all enterprise customer contact sites (including systems and applications) are integrated, responsive and personal. Moreover, an enterprise running as a ZLE creates a view of customers data 30 that is consistent across the enterprise and available substantially simultaneously enterprise-wide.

Indeed, in a ZLE information becomes available everywhere across the enterprise in real-time. For example, suppose a clerk records a product shipment transaction into an enterprise resource at a particular enterprise site. Almost immediately after the 'enter' key is pressed, the information is available to analysts via a data mining application, analysis results can be available to the clerk via the feedback mechanism, including a reporting application, and manufacturing-on-demand information can be available to suppliers who have access to the supply chain information.

Relating again to FIGS. 4 and 5 for a second example, at the time of contact with a customer, the customer representative of a telecommunication enterprise can suggest a new calling-program based on results from the data mining application and the customer's profile (such as up-to-date call history, e.g., number of calls per pay period, etc.). As a third example, an insurance provider can introduce new products more quickly by establishing a ZLE framework with a dynamic central data clearing used by all applications. As fourth example, a healthcare provider can integrate a patient's medical record and current treatment information and use this real-time information to flag medication conflicts to a remote pharmacist associated with and having a real-time view of the patient's health care information.

Next, the approach—zero latency involves real-time recognition of business events, which in turn leads to a more competitive and profitable business. To become a zero latency enterprise, an enterprise integrates, in real time, its data and services. This approach involves a ZLE solution that simultaneously synchronizes and routes information across the enterprise. As a means to that end, enterprise application integration (EAI) provides a mechanism that propagates business events across the enterprise from one system to another. In addition, a central enterprise cache, or operational data store (ODS) provides the mechanism for dynamically integrating data into a central repository. This data store consolidates data from across the enterprise in real time and supports transactional access to up-to-the-second data from multiple systems and applications. Unlike an IT infrastructure with a conventional data warehouse, the IT infrastructure of a ZLE allows operational systems and applications to access real-time data from across the enterprise; and, the real-time data can be made available to business intelligence applications for real-time analysis and feedback and to data marts and periodic queries.

Additionally, the aforementioned enterprise-wide integration for enabling the ZLE is implemented in a framework that is beneficially extensible. The ZLE framework is extensible in order to allow new capabilities and services to be added. Furthermore, no matter how ZLE is accomplished, it needs to encompass and deliver the performance and transactional integrity of a business-critical operational system. Hence, the ZLE solution provides an operational solution that includes even more than the merger of enterprise application integration and real-time data warehousing.

Figure 8:
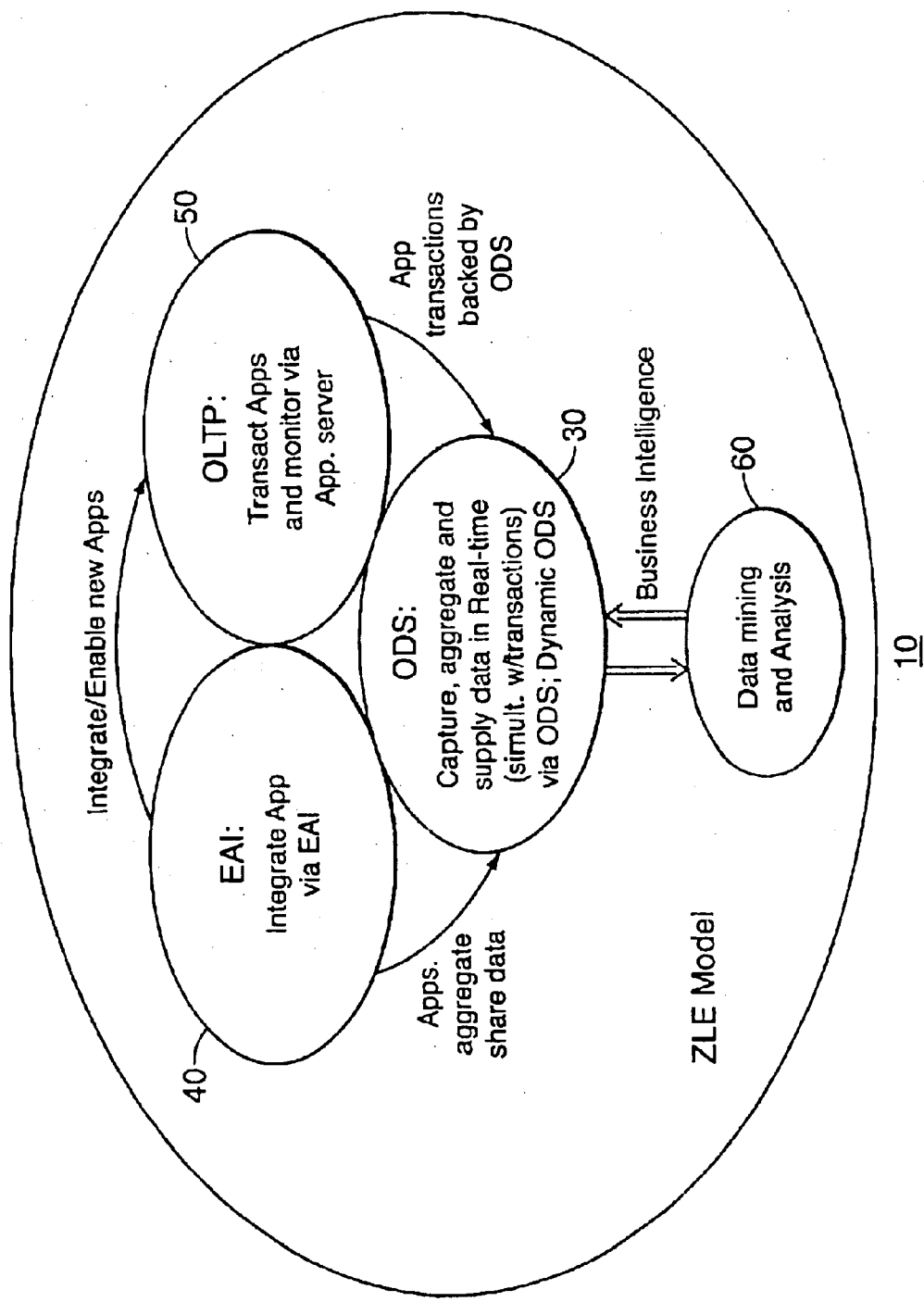
FIG. 8 illustrates the ZLE model as a blueprint for ZLE architecture.

It takes architecture to enable a ZLE, and a blueprint for this architecture is described as the ZLE model in FIG. 8. In accordance with the present invention, the ZLE framework is not about a single product, middleware or monolithic solution. The ZLE framework 10 defines a multilevel architecture (the ZLE architecture) that provides much more than an integration platform with application integration (EAI) technologies, although it integrates applications and data across an enterprise; and it provides more comprehensive functionality than mere data warehousing, although it supports data marts and business intelligence functions. As a basic strategy, the ZLE framework integrates applications through the EAI 40, aggregates data through the ODS (operational data store) 30, executes in a server 50 transactions backed by the ODS 30, enables integration of new applications via the EAI 40 backed by the ODS 30, supports it feedback functionality via the data mining and analysis 60 and reporting mechanism, and so on. Accordingly, the ZLE framework is fashioned with hybrid functionality for synchronizing, routing, caching, data and business intelligence and transacting enterprise business, in real time, thus enabling coherent operations and reduction of operational latencies in the enterprise.

The ZLE framework routes information across various enterprise applications using EAI technologies, and aggregates data in an operational data store ('ODS' or 'data store' in short) functioning as a central repository for enterprise-relevant information. The ZLE framework assimilates many existing and new products, tools, and services that work together to achieve a consolidated, up-to-date view of state and data that is gleaned from the central repository. Although it is not a real time data warehouse system, the ZLE framework supports DSS (decision support systems) and data mart operations. Thus the data store is also a central repository and real-time data source for data mining and analysis of enterprise business intelligence applications. Additionally, with the data store capability and centralized creation and management of rules and policies, the ZLE framework allows consistent, real-time application of business rules and policies across the enterprise including all its products, services, and customer interaction channels. Furthermore, the ZLE framework allows developing an enterprise IT infrastructure toward reducing unwanted operation latencies.

ZLE: Extensibility (e.g., Scalability) and Availability

Extensibility (e.g., scalability) and availability are attributes of a ZLE that are made possible by the ZLE architecture. A scalable enterprise can be extended and grow in size. An available enterprise can operate even in the event of a partial failure of any of its parts. A ZLE enterprise is available and can be scalable in real-time, by providing real-time view of the enterprise to enterprise partners and other enterprise extensions.

As mentioned, to enable an extensible and available enterprise, extensibility (e.g., scalability) and availability are characteristic of the ZLE architecture. The extensibility and availability are devised not so much in terms of massive parallelism or high availability configurations of architectural components but in terms of how services, applications and data are integrated and how the information is cached. By definition, closely dependent systems are limited in terms of scalability and availability because of their recurrent inability to function without each other or scale independently.

For example, an e-store may need to access a credit system to check a customer rating before completing a transaction (See, e.g., FIGS. 3–7). Caching the customer rating and transaction data in the central repository as opposed to communicating the data between applications loosens application bonds without disrupting their functional integration. In other words, there is 'breathing room' so that faults in one application don't necessarily cascade over the entire architecture, and each system can scale at its own pace.

In another example, an enterprise may need to add agents to and support extended operations of its call center. Being scalable, the enterprise can scale its call center operations by outsourcing such operations. To allow the enterprise to operate this way, outside vendors are connected via the ZLE framework to have real-time access to and view of relevant enterprise-wide data.

ZLE Architecture

Figure 9:
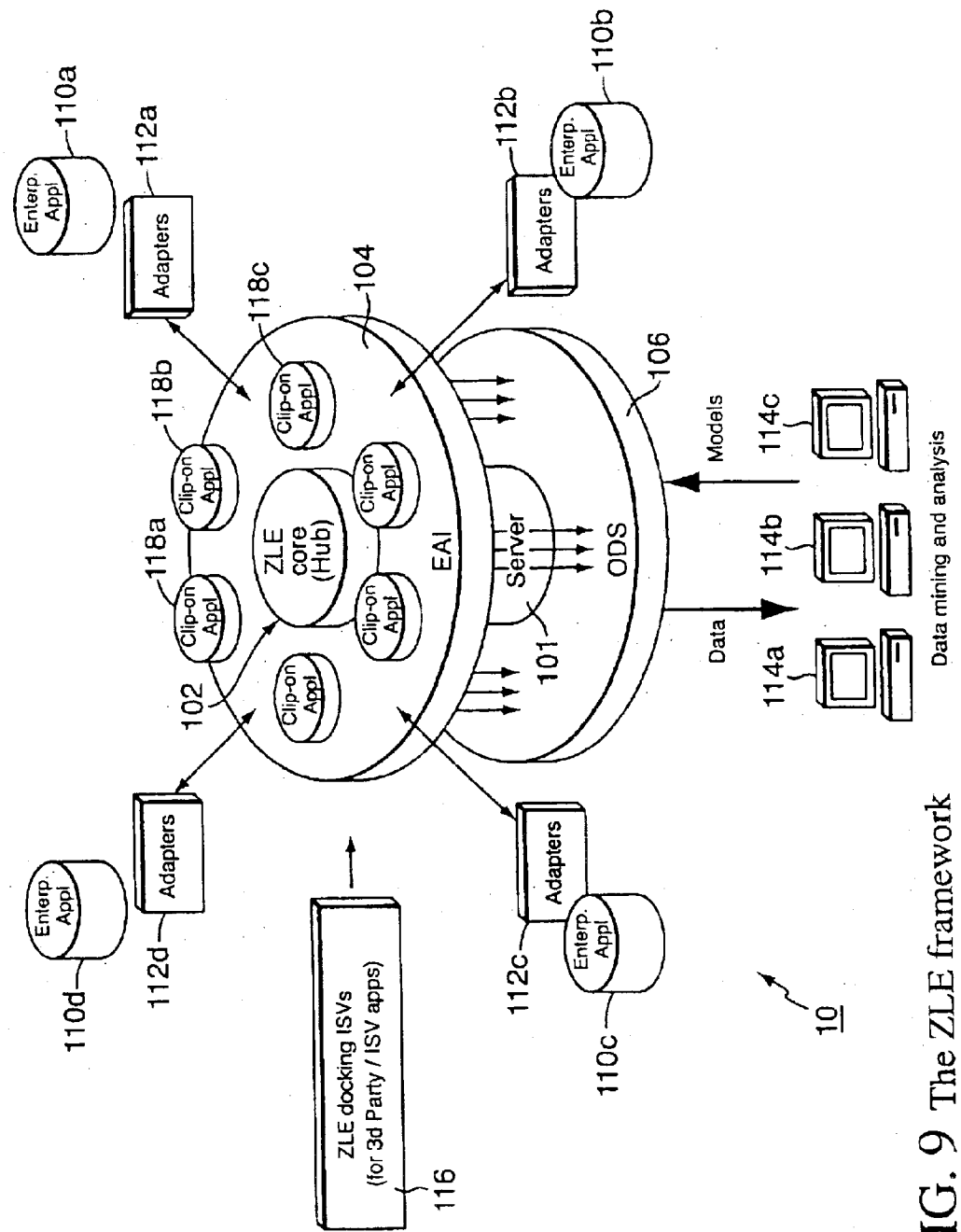
FIG. 9 illustrates a ZLE framework that defines, in the preferred embodiment, a multilevel architecture (ZLE architecture) centered on a virtual hub.

The ZLE framework defines, in the preferred embodiment, a multilevel architecture (ZLE architecture) centered on a virtual hub, called the ZLE core, as shown in FIG. 9. The preferred ZLE framework 10 defines ZLE architecture that serves as a robust system platform capable of providing the processing performance, extensibility, and availability appropriate for a business-critical operational system. The enterprise data caching functionality (DOS) 106 of the ZLE core 102 is depicted on the bottom and its EAI functionality 104 is depicted on the top. Clip-on applications 108 are tightly coupled to the ZLE core 102 residing on top of the ZLE core and directly accessing its services. Enterprise applications 110, such as SAP's (Systems Applications Products) enterprise resource planing (ERP) application or Siebel's customer relations management (CRM) application, are loosely coupled to the ZLE core 102 being logically arranged around the ZLE core and interfacing with it via application or technology adapters 112. The docking of ISV (independent solutions vendors) solutions such as enterprise applications 110, is made possible with the ZLE docking 116 capability. Data mining and analysis applications 114 pull data from the ZLE core 102 and contribute result models to it that can be used to drive new business rules, actions, and so on. Although the data mining and analysis applications 114 are shown residing with systems external to the ZLE core, they can alternatively reside with the ZLE core 102.

The ZLE framework includes elements that are modeled after a transaction processing (TP) system. In broad terms, a TP system includes application execution and transaction processing capability, one or more databases, tools and utilities, networking functionality, an operating system and a collection of services that include TP monitoring.

At the ZLE Core

Figure 10:
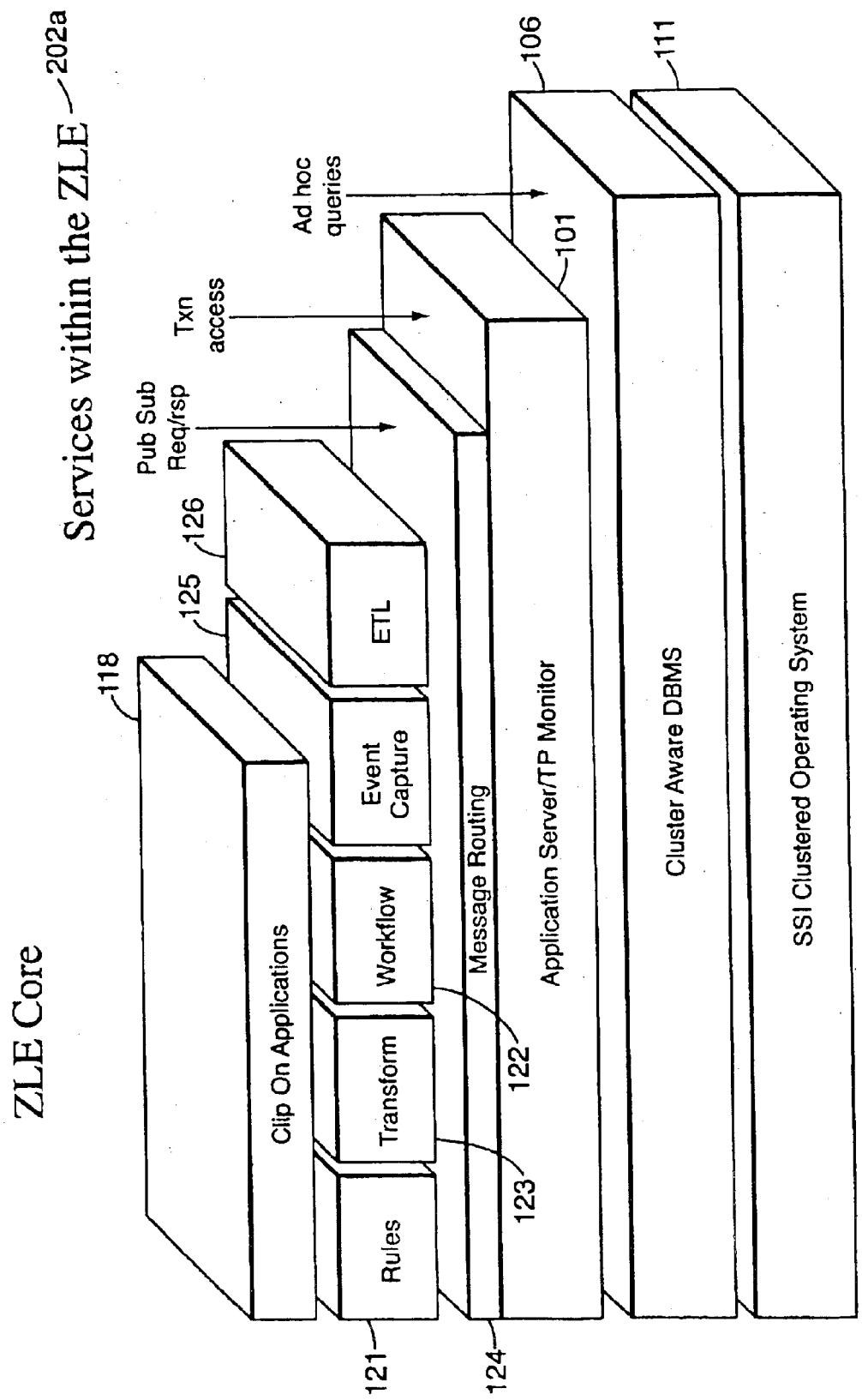
FIG. 10 illustrates the core of the ZLE framework.

In this embodiment, at the core of the ZLE framework resides a set of ZLE service—i.e., core services and capabilities—as shown in FIGS. 10 and 11. The core services 202 include native services and core ISV services (ISVs are third-party enterprise software vendors). The ZLE services (121–126) are preferably built around Tuxedo 206, CORBA 208 or Java technologies (CORBA stands for common object request broker architecture). The ZLE services (121–126) are executed on a server, preferably a clustered server platforms 101 such as the Compaq NonStop™ Himalaya™ server or the Compaq AlphaServer™ server running the Tru64™ UNIX operating system 111 (The Compaq servers are developed by Compaq Computer Corporation of Houston Tex.). The Compaq clustered server platforms 101 provide the parallel performance, extensibility (e.g., scalability), and availability requisite for business-critical operations. When either a Tuxedo or CORBA/Java framework 206 or 208 is available for use, the CORBA/Java framework can interface to Tuxedo applications and vice versa.

Whichever clustered server platform is used in forming the ZLE core of the illustrated embodiment, the ZLE core components include: 1) Cluster-aware RDBMS 106 for an ODS or a real-time enterprise cache which in the case of the ZLE is a central repository; 2) transactions application server 101, acting as a robust hosting environment for integration services and clip-on applications 118; and 3) services 121–126 (that will be later described).

These components are not only integrated, but the ZLE core is designed to derive maximum synergy from this integration. Also, many of the services at the core of ZLE, such as those governing rules, workflow, and message transformations, are derived from core ISVs. Core ISVs optimize the ability to integrate tightly with and leverage the ZLE architecture, enabling a best-of-breed strategy. They contribute essential ZLE services that enable a true Compaq ZLE™.

It is noted that Compaq®, Compaq ZLE™, AlphaServer™, Himalaya™, NonStop™, and the Compaq logo, are trademarks of Compaq Computer Corporation of Houston, Tex. True64™ is a trademark of Compaq information Technologies Group, L. P., and UNIX® is a trademark of the Open Group. Any other product names may be the trademarks of their respective originators.

Application Server Environment

As part of the ZLE core, the application server environment (101 and 111, FIG. 10) is a key element of the ZLE architecture as it supports the need for a high-performance application server environment with strong transaction monitoring capabilities. In broad terms, the application server is a key component of any transaction processing (TP) system that is capable of parallel processing, and supports concurrent OLTP (on-line TP), TP monitoring and management of transactions-flow through the TP system. The application server environment advantageously provides a common, standard-based framework for interfacing with the various ZLE services and applications as well as ensuring transactional integrity and system performance (including scalability and availability).

For higher levels of scalability, availability, and data integrity, the application server preferably resides on the NonStop™ Himalaya™ platform, where it can be based on Tuxedo, CORBA or Java technologies for optimum interoperability (See: FIG. 11). CORBA allows applications at different locations and developed by different vendors to communicate via an interface broker called the object request broker. Java is a robust programming language designed for use in the distributed environment of a network of computers such as the Internet. Java allows applications designed for platform to be portable to another platform (FIG. 11).

Alternatively, the application server can reside on the AlphaServer™ system running the Tru64 UNIX operating system, where it can be based on off-the-shelf application servers—from companies such as Oracle, BEA, and IONA—using CORBA or Java technologies.

ODS with Cluster-Aware RDBMS Functionality

Integral to the ZLE core and also very important in the ZLE framework is the ODS with its relational database management system (RDBMS) functionality (106 FIG. 10). The RDBMS is optimized for massive real-time transaction and loads, real-time queries, and batch-extraction. The cluster-aware RDBMS is able to support the functions of an ODS contaning current-valued, subject-oriented, and integrated data reflecting the current state of the systems that feed it. Ideally, it can also function as a message store and a state engine, maintaining information as long as required for access to historical data. It is emphasized that ODS is a dynamic data store and the RDBMS is optimized to support the function of a dynamic ODS.

Figure 12A:
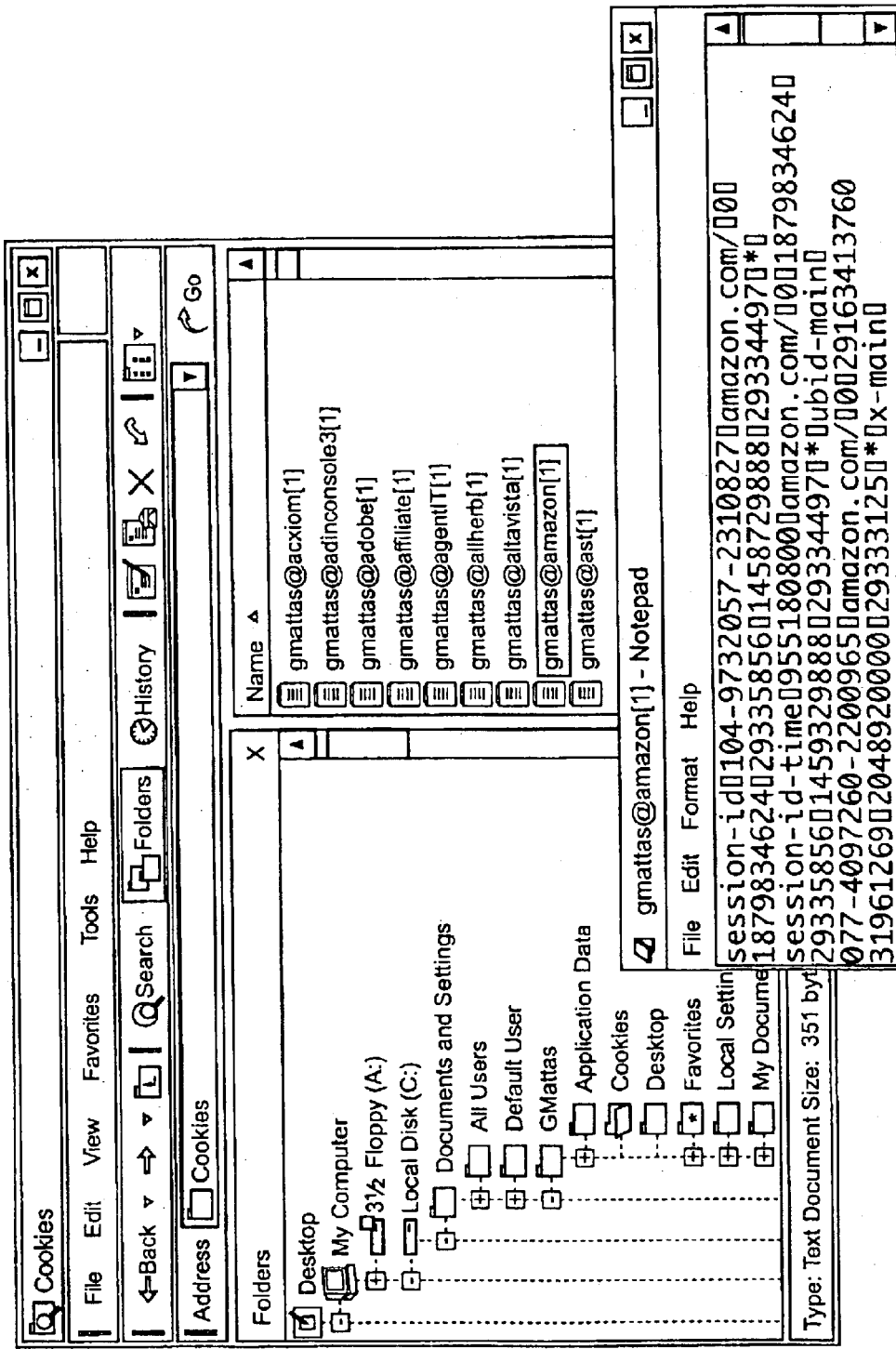
Figure 12C:
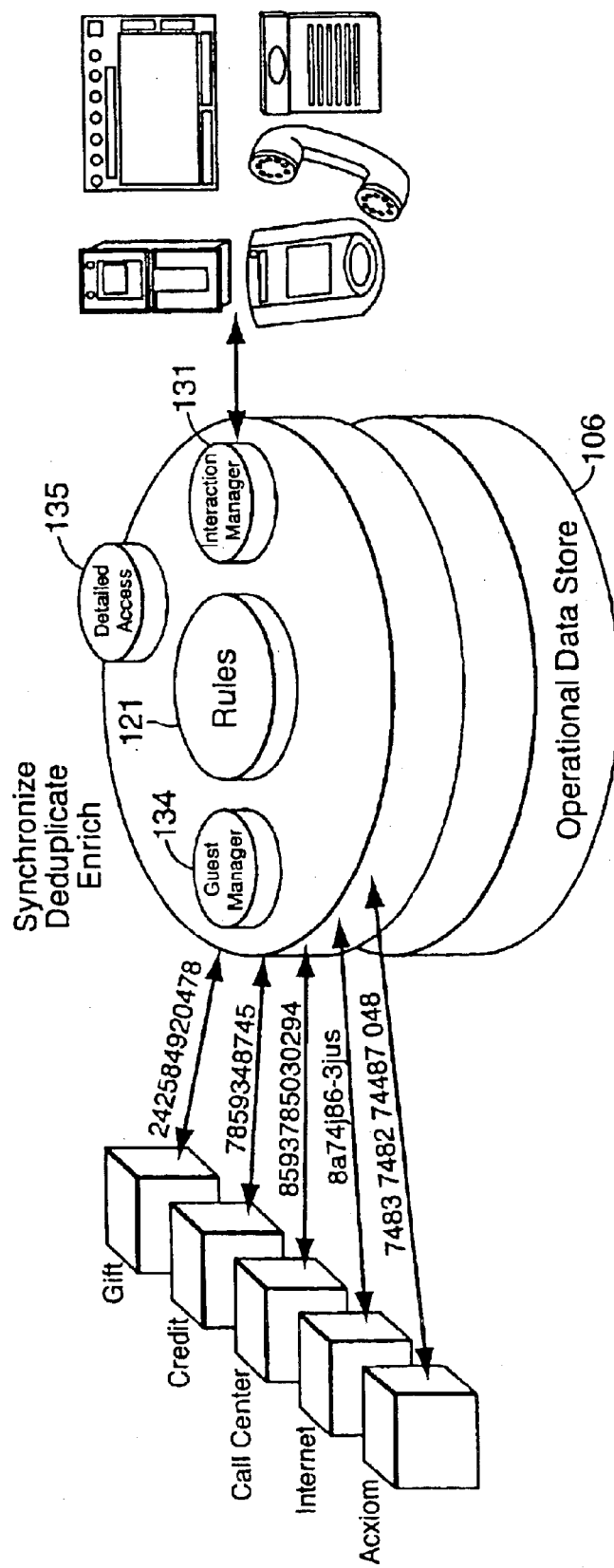

The cluster-aware RDBMS component of the ZLE core in this embodiment is either the NonStop™ SQL database running on the NonStop™ Himalaya™ platform or Oracle Parallel Server running on the Tru64 UNIX AlphaServer™ system. In supporting its ODS role as a real-time enterprise cache, the RDBMS contains preferably three types of information: state data, event data and lookup data. State data includes transaction state data or current value information such as a customer's current account balance. Event data includes detailed transaction or interaction level data, such as call records, credit card transactions, Internet or wireless interactions, and so on. Lookup data includes data not modified by transactions or interactions (i.e., an historic account of prior activity). See: FIGS. 12a–12c.

Overall, the database is optimized for application integration as well as real-time transactional data access, and updates including for analysis and business intelligence. For example, a customer record in a ZLE data store (i.e., ODS) might be indexed by customer ID (rather than by time, as in a data warehouse) for easy access to a complete customer view. In this embodiment, key functions of the RDBMS includes dynamic data caching, historical or memory data caching, robust message storage, state engine and real-time data warehousing.

The dynamic data caching function supports a dynamic, real-time ODS function. For a dynamic, real-time ODS, the RDBMS employs dynamic data caching to aggregate, cache and allow real-time access to real-time state data, event data and lookup data from across the enterprise. Advantageously, this function, for example, obviates the need for contacting individual information sources or production systems throughout the enterprise in order to obtain this information. As a result, this function greatly enhances the performance of the ZLE framework.

The historical data caching function allows the ODS to also supply a historic account of events that can be used by newly added enterprise applications (or clip-on applications). See, e.g., FIGS. 12a and 12b. Typically, the history is measured in months rather than years. The historical data is used for enterprise-critical operations including for transaction recommendations based on customer behavior history The robust message store function supports the EAI platform for ZLE hub-based publish and subscribe operations (that are explained in more detailed in the aforementioned related copending U.S. application Ser. No. 10/013, 091, entitled "ZLE Enriched Publish/Subscribe"). For message publishing (pushing to ODS) and message subscription (pulling from ODS and dissemination), the RDBMS caches and queues messages for subscribers (relating for example, to specific events and their results). Performing publish and subscribe through the relational database enables the messaging function to leverage the parallelism, partitioning, and built-in manageability of the RDBMS platform. Priority, first-in/first-out, guaranteed, and once-and-only-once delivery are all supported in this platform.

The state engine functionality allows the RDBMS to maintain real-time synchronization with the business transactions of the enterprise. The RDBMS state engine function supports workflow management and allows tracking the state of ongoing transactions (such as where a customer's order stands in the shipping process) and so on.

The real-time data warehousing function of the RDBMS supports the real-time data warehousing function of the ODS. This function can be used to provide data to data marts and to data mining and analysis applications.

Core ZLE Services

In an embodiment of the ZLE framework, the ZLE core services reside on top of the transactional application environment and use its Tuxedo or CORBA/Java framework as well as its underlying parallel computing platform (server). A broad range of basic services is incorporated into the ZLE architecture. These include services for business rules enforcement, message transformation, workflow and Bulk data extraction. In other words, as shown in FIG. 10, the services include: 1) rules service 121, for event-driven business rules creation, analysis and enforcement. The business rules enforcement service is provided for defining and applying enterprise rules and policies across the enterprise; 2) workflow (process-flow) service 122 for supporting global business transactions across multiple systems and for mapping and controlling the flow of business transactions across the enterprise; 3) message transformation service 123 for efficiently integrating diverse data from any number of disparate sources applications; 4) parallel message router and inserter service 124 for high performance, high-volume routing, and insertion of data into the ODS and other ZLE services and applications; 5) event capture service 125 for supporting the enterprise-wide business; and 6) extraction, transformation, and load (ETL) service 126, to move bulk data into and out of the ODS and across database and platform boundaries. The bulk data extraction service is for uploading aggregated batched transactions back into the ODS, for uploading aggregated batched transactions cak into the ODS, and for moving huge volumes of data quickly out of the ODS to production systems, business intelligence systems, and so on. These services and others, can be provided by Compaq, the originator of the ZLE framework, or ISVs.

There is a great deal of synergy between the services as well. For example, the rules service can be used by the other services within the ZLE core and any clip-on and enterprise applications that an enterprise may add, for providing enterprise-wide uniform treatment of a business transaction based on enterprise-wide uniform rules.

Message Routing

A powerful message routing and insertion capability (124 FIG. 13) is needed for routing high volumes of messages through the ZLE architecture. This capability can include content-based routing and use of the ODS (RDBMS) as a centralized message store and queuing system for efficient publish/subscribe message distribution. Essentially, this message routing and insertion capability is routing between the internal components of the ZLE core. Hence, although the ZLE framework supports messaging oriented middleware (MOM), such as the IBM MQSeries software, this capability differs from the functionality of routing and queuing systems that move messages from application to application (such as the IBM MQSeries software; IBM-Information Business Machines, Inc, of Armonk, N.Y.).

Rules Service

The rules service (See, e.g., 121 FIG. 10 and FIG. 13) enables writing business rules using graphical user interface or syntax like a declarative, English-language sentence. Additionally, the rules service finds and applies the most applicable business rule upon the occurrence of an event, and arrives at the desired data/answer as rapidly as possible which is uniform throughout the entire enterprise. Hence this service may be referred to as the uniform rules service. This service allows the ZLE framework to provide a uniform rule-driven environment for flow of information and supports it feedback mechanism.

To that end, the ZLE core incorporates an inference-based rules engine 121 FIG. 13a (e.g., Brokat Blaze Advisor) that quickly and efficiently finds the appropriate business rule, regardless of the complexity of the rules or the size of the rules set. The rules service also integrates the rules and policies of an enterprise in a centralized location (ODS at the ZLE hub), next to the message stream. This position allows it to drive workflow, facilitate rapid changes to the rules, and ensure consistent application of business rules in all systems across the enterprise (e.g., call centers, e-commerce sites, POS applications, and so on).

In this embodiment, the rules engine in the ZLE framework is a Java implementation that has been wrapped in the interaction manager (131 FIG. 13a) to execute on top of this parallel, available middleware of the framework. (The interaction manager will be explained later. Middleware products automate much of the basic connectivity. Thus, instead of, for example, building point-to-point links, middleware products automate the basic connectivity involved in applications putting data onto a CORBA object request broker (ORB). This allows the data to be use by any CORBA-compliant application.) The rules engine is preferably a pure Java-based full-inference engine that is flexible, capable of GUI (graphics user interface) driven rules and is minimally impacted by the size of the rules set. In addition, the rules engine is preferably non-sequential and non-iterative.

Scenarios in which the interaction manager and rules engine cooperate to produce a prompt or response can be better explained in connection with a particular type of business (See: FIG. 12c and FIG. 13a). For example, in a retail business where customer can engage in multiple transactions with the enterprise and each transaction may involve a unique identity of that customer. From the historic account of customer interaction(s) at the ODS, the interaction manager can recognize each of the unique identifiers as being associated with the same customer. Via the rules engine the interaction manager can provide a rule-based response in view of this finding (such as: this identification belongs to a customer that is not to be serviced after one or more fraudulent transaction attempts). This is so, even if the customer attempts to remain anonymous and uses a different channel of communication with the enterprise (See, e.g. FIGS. 7, 12a–c, 13a and 13b).

Workflow Service

The process-flow (workflow) service (122 FIG. 10) manages the flow of business transactions and processes between multiple systems and applications that are integrated via the ZLE framework and may take only seconds or up to days to execute. This entails monitoring and managing ongoing transactions as well as ensuring the correct flow of business transactions. For example, when a customer opens an account, disputes a charge, returns a product, or even changes an address, such action (event) launches a series of sequential business transactions. The workflow (process-flow) service leverages the state engine capabilities of the ZLE core database to track the state of the transaction—and provide visibility into its progress—over the ensuing hours, days, and weeks it takes to run its course. The workflow service in the ZLE framework is, for example, an EJB (Enterprise Java Bean, Java 2 enterprise edition (J2EE)) compliant service running on parallel, available application servers that can store its workflow as XML data structures. XML stands for eXtensible Markup Language. It is a subset of SGML (Standard Generalised Markup language) and was originally designed to make it easier for Internet users to interchange structured documents. XML schema expresses shared vocabularies and defines the structure and content of XML documents (using Document Type Definitions).

Message Transformation Service

By mapping differences in message syntax, semantics, and values, the message transformation service (123 FIG. 10) within the ZLE core assimilates diverse data from multiple sources for distribution to multiple diverse destinations. The message transformation service enables content transformation and content-based routing, thus reducing the time, cost, and effort associated with building and maintaining application interfaces.

In this embodiment the graphic interface in the Non-Stop™ Data Transformation Engine (based on Mercator) streamlines this task specially when complex data formats, such as EDI (electronic data interchange format X12, EDIFACT), S.W.I.F.T. (for financial transactions), HL7 (healthcare data formal), and ACORD (insurance data format), need to be transformed into a standard or common format. A standard or common message format allows various applications to understand the event and its content regardless of how different they are.

Parallel Message Router and Inserter Service

The high-performance parallel message router and inserter service (124 FIG. 10) within the ZLE core moves large volumes of messages to the ODS (where they are captured with minimal transformations) or to other services in the ZLE core. As discussed previously, the database (ODS RDBMS) can act as a database for storing transactions in SQL tables or as a message store-caching and queuing messages for publish/subscribe distribution. Constantly refreshed information, such as stock prices or data on inventory levels, can be inserted into the ODS and then published to the appropriate subscriber. The router and inserter function leverages the parallelism of the ZLE platform to propagate high volumes of messages to the database and elsewhere within the ZLE framework.

Extraction, Transformation, and Load (ETL) Service

The ETL service (126 FIG. 10) within the ZLE core enables large volumes of data to be moved quickly and reliably in and out of the databases (often across database and platform boundaries) for use by analysis or operational systems as well as by clip-on applications.

Leveraging the ZLE Core

In the ZLE framework scheme, the ZLE core (or ZLE hub) is a virtual hub for various specialized applications that can clip on to it and are served by its native services. Any specialized applications—including those that provide new kinds of solutions that depend on ZLE services—can clip on to the ZLE core. The ZLE core is also a hub for data mining and analysis applications that draw data from and feed result models back to its ODS. Indeed, the ZLE framework combines the EAI, ODS, OLTP (on-line TP), data mining and analysis, automatic modeling and feedback, thus forming the touchstone hybrid functionality of every ZLE framework. To this functionality others can be added including the functionality of native and core ISV services and of clip-on and enterprise applications. Moreover, the ZLE hub enables an array of enterprise applications—from ERP to legacy OLTP applications and from database to Web server applications—to interface to and become part of the ZLE framework. The ZLE framework provides the means for pulling together and integrating all of these third-party applications.

Clip-On Applications

Figure 13:
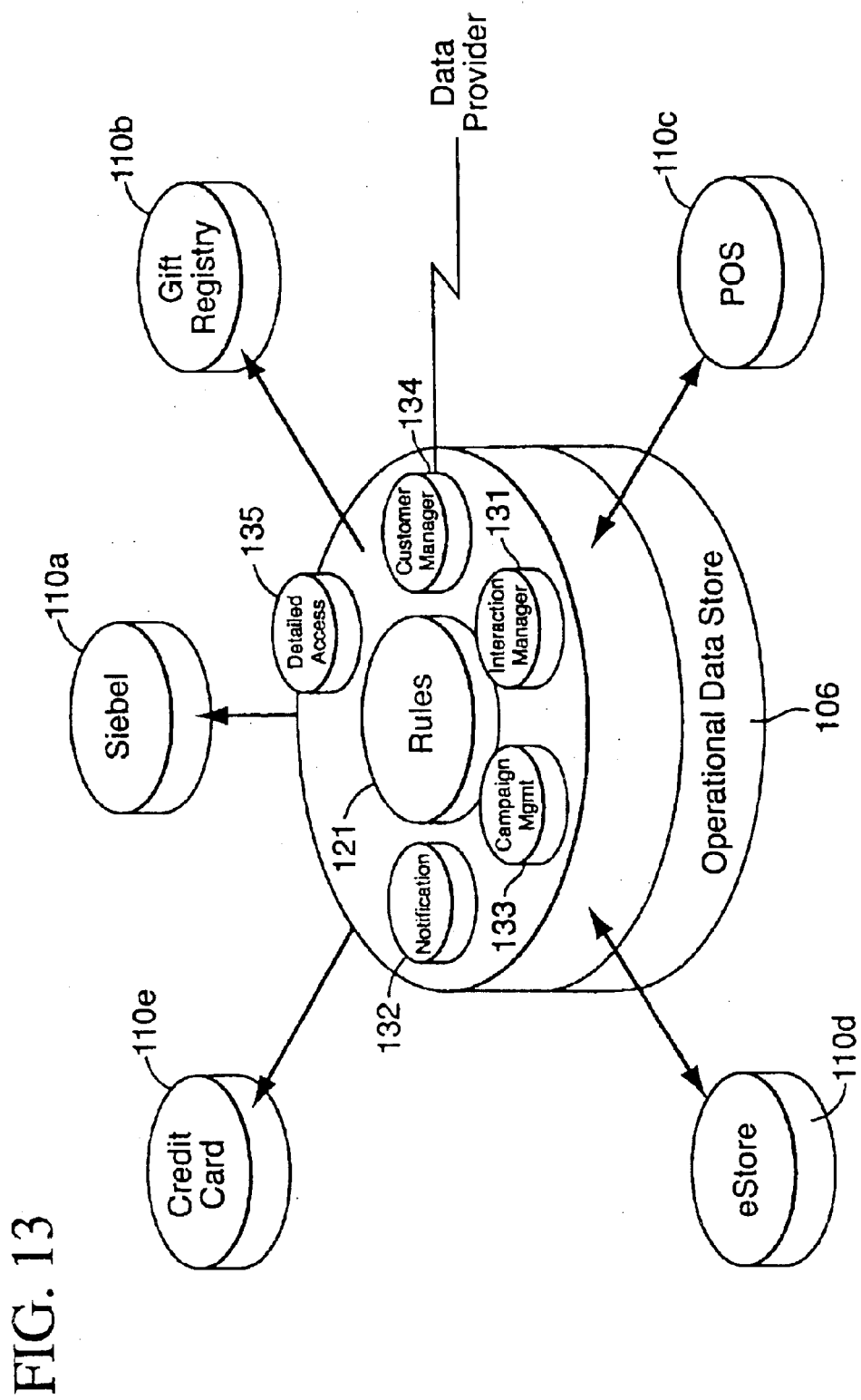
Figure 13B:
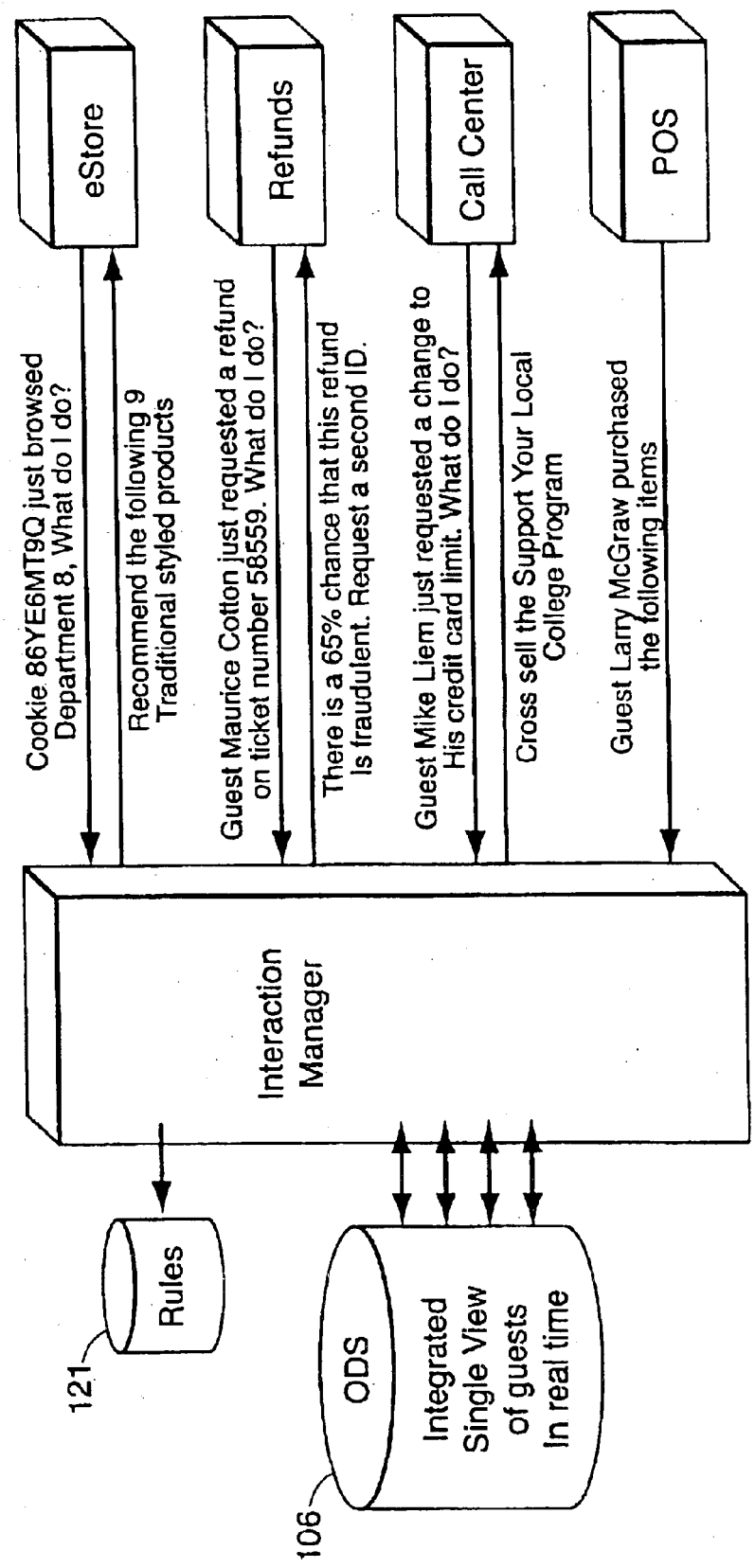

Clip-on applications, literally clip on to, or are tightly coupled with, the ZLE core (See, e.g., 118 FIGS. 9–11; and in more detail 131–135 FIG. 13). They are not standalone applications in that they require the substructure of the ZLE core and its services (e.g., native core services) in order to deliver highly focused, business-level functionality of the enterprise. Clip-on applications provide business-level functionality that leverages the ZLE core and customizes it for specific purposes, such as real-time fraud detection (designed to leverage the rules service within the ZLE core). Clip-on applications enable the addition of unique (custom) services that can leverage the ZLE core's real-time environment and application integration capabilities. Thus, ISVs (such as Trillium, Recognition Systems, and MicroStrategy) as well as the originator of the ZLE framework (Compaq Computer Corporation) can contribute value-added clip-on applications such as for fraud detection, customer interaction and personalization, customer data management, narrowcasting of notable events, and so on, as shown in FIG. 13. A major benefit of clip-on applications is that they enable enterprises to supplement or update its ZLE core native or core ISV services by quickly implementing new services. Examples of clip-on applications include interaction manager 131, narrowcaster 132, campaign manager 133, customer data manager 134 and more. The following describes these examples in some detail.

Interaction Manager

As shown in FIG. 13a, the interaction manager application 131 (by Compaq Computer Corporation) leverages the rules engine 121 within the ZLE core to define complex rules governing customer interactions across multiple channels. The Interaction manager also adds a real-time capability for inserting and tracking each customer transaction as it occurs so that relevant values and more can be offered to consumers based on real-time information.

Narrowcaster

The narrowcaster application 132 preferably uses MicroStrategy software that runs against the RDBMS of the ODS in order to notify a notable event (hence it is also called notification application). Notable events are detected within the ZLE framework in real-time. Then, sharing data (in the ODS) that the interaction manager and rules engine have used to assert the notable event, the narrowcaster selectively disseminates a notification related to such events. The notification is narrowcasted rather than broadcasted (i.e., selectively disseminates) to terminals, phones, pagers, and so on of specific systems, individuals or entities in or associated with the enterprise (See, e.g., FIG. 13c). For example, if a transaction that poses a higher risk to the enterprise or a customer of the enterprise is uncovered, an entity in or associated with the enterprise is notified that this transaction has been identified as presenting such risk before the transaction is completed. Thus, if for instance a call center operator (or an automated system) is transacting with a customer and the transaction poses a risk of fraud, the narrowcaster notifies the call center operator (or automated system), in real-time, before that transaction is completed (so that service can be timely denied).

Campaign Manager

Figure 1:
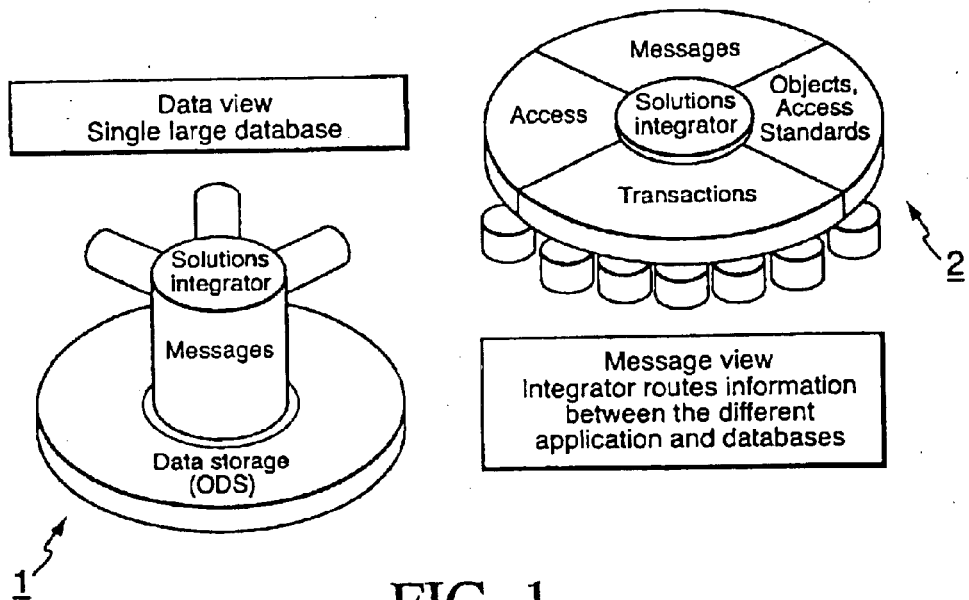
FIG. 1 shows two disjointed infrastructures that cannot leverage each other in real-time.
Figure 13C:
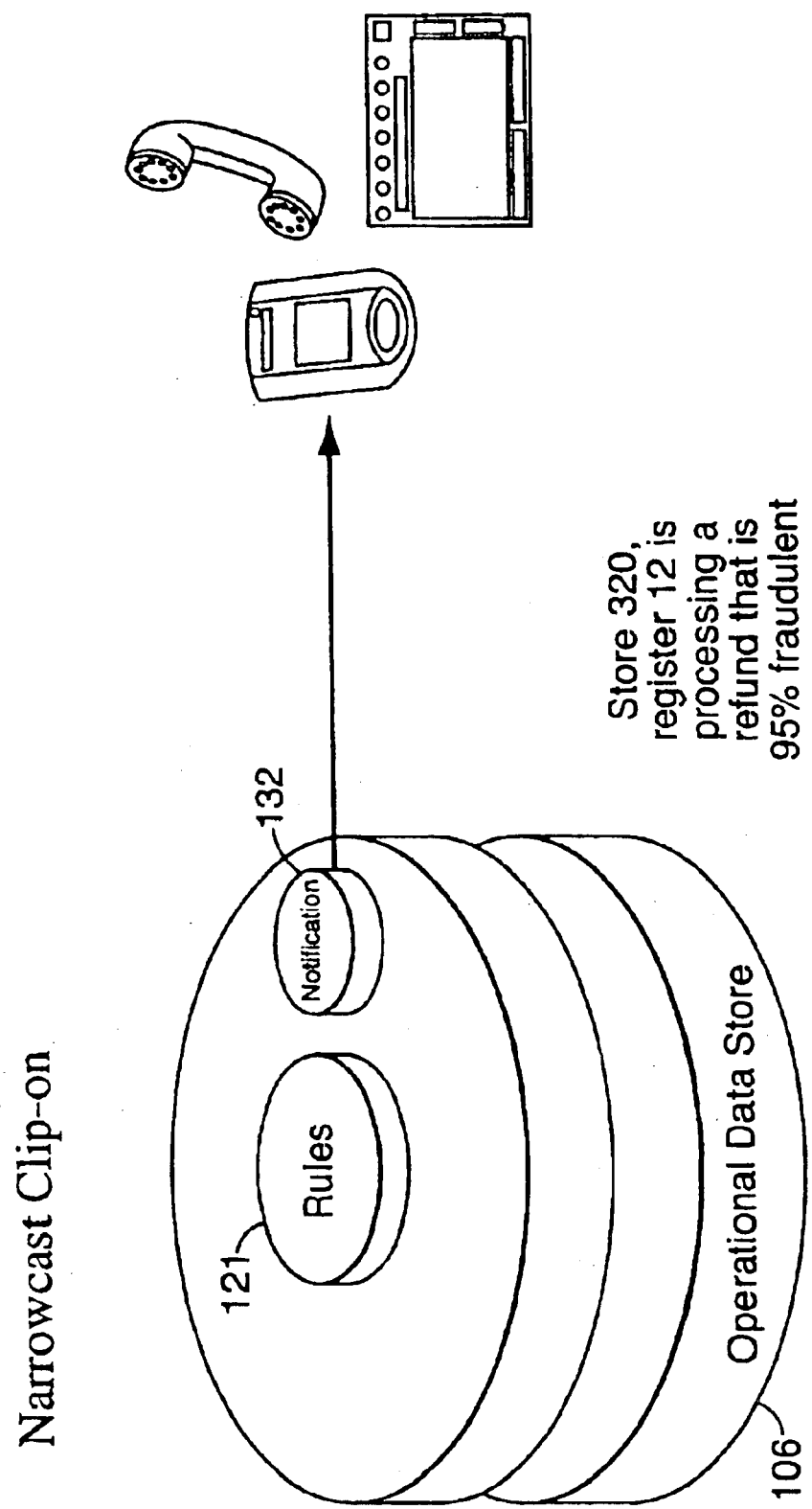
Figure 13D:
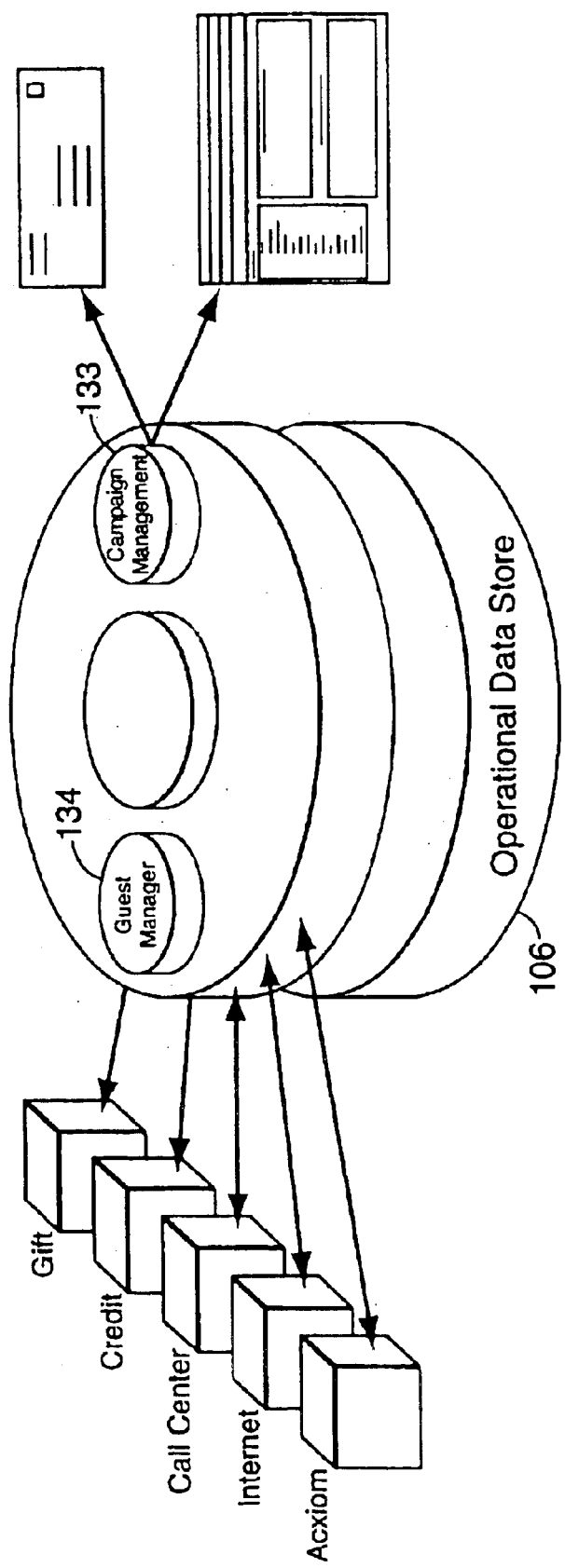

The campaign manager application (133 FIG. 13d) can operate in a recognition system such as the data mining and analysis system (114, FIG. 1) to leverage the huge volumes of constantly refreshed data in the ODS of the ZLE core. The campaign manger directs and fine tunes campaigns in real time based on real-time information gathered in the ODS. See: FIG. 13c.

Customer Data Manager

In this embodiment, the customer data manager application (34 FIG. 13) leverages Trillium's customer data management software to synchronize, delete, duplicate and cleanse customer information across legacy systems and the ODS at the ZLE core's in order to create a unified and correct customer view.

Building the ZLE Framework

When all these concepts, requirements, and components of the ZLE framework are viewed together, a picture emerges of an end-to-end extensible multilevel architecture that integrates data, applications and business processes from across the enterprise in real time to support real-time actions. As outlined before, the ZLE framework brings new extensibility (e.g., scalability), availability and, with the ODS as a central repository, performance independence to enterprise functions. The ZLE framework allows integration of new types of applications that much like pre-existing applications partake in the real-time data and application integration.

To this end, the present invention provides a proven blueprint to implement the vision. That is, the present invention as described herein-above and below provides a blueprint for building the ZLE framework (See, e.g., FIG. 8).

Building a ZLE framework around a transactional application server means gaining all the hosting benefits of the application server. In this embodiment of the ZLE framework, that means the ability to run parallel tasks that are dynamically load balanced across nodes on the Non-Stop™ Himalaya™ server or on the AlphaServer™ system running the Tru64 UNIX operating system. This also means the ability to monitor transactions (such as the above-mentioned business transactions) and restart them in the event of failure, manage transaction boundaries, manage queues, and so on.

The ZLE core services, such as rules and messaging, execute on top of this environment, which means that they inherit all these advantages. Equally important, a transactional application server environment provides a common framework with which these services or any other applications interface and through which they interact with each other notwithstanding their disparate design platforms or features (as mentioned, the various application can include web servers, ERP applications, and any legacy applications and databases). Hence, an IT infrastructure that is based, for example, on Tuxedo technology is 'at home' when integrated with a ZLE framework and its services via Tuxedo. The same holds true for CORBA and Java (or any compatible broker) technology-based infrastructures. Essentially, it boils down to selecting the framework that provides the highest level of comfort and the maximum amount of flexibility for any given IT infrastructure—the basic functionality is the same in either case. The scenario shaped by the ZLE framework is compelling in that it promises reduced operational inconsistencies, instant awareness of business events, increased competitiveness, and more.

ZLE Framework Takes Best-of-Breed Applications

The ZLE framework represents something new in the IT industry. By providing an open integration platform for best-of-breed applications, the ZLE framework enables enterprises to leverage the functionality of a wealth of ISV applications on top of a robust ZLE platform. Such applications are able to draw on the strengths of the ZLE architecture (parallelism, massive scalability, continuous availability, and so on) and add their own value to it.

ISV applications can be loosely or tightly coupled, to become a logical or integral part of the ZLE core functionality, respectively. Tight coupling of applications on a large a scale as provided in the ZLE framework has not been seen before, and certainly not in the EAI world. But it is in EAI where it can make the most difference. This is because, with EAI supporting tightly integrated core services functionality, the ZLE framework can benefit from a vast range of tightly integrated functionality—from rules and workflow to message transports and transformations—that is required for the business of the enterprise. For an enterprise, this scheme translates into the best possible solution, as it is based on the best-of-the-breed applications in the industry. For example, a customer can sign their name once, and the signature or information or transaction unlocked with that signature is available across the enterprise for any best-of-the-breed application integrated with the ZLE core. In other words, there is no need to obtain from the customer an additional signature for other applications handling other interactions with this customer through other channels.

Data Mining and Analysis Tools

Usually, databases are configured either for OLTP (on-line transaction processing) or for OLAP (on-line analytic processing) and data analysis in order to optimize and maximize database performance. However, in ZLE solutions there is a need to perform mixed workloads, OLTP and OLAP, concurrently against the same ODS. Namely, the ODS is not only for OLTP. This adds a significant value to the ZLE solutions. Through data mining and analysis applications, and knowledge discovery applications (e.g., OLAP applications) running against the same ODS, the ZLE solutions support concurrent operations for OLTP as well as for OLAP. Thus, the ZLE framework enables integration with the ZLE architecture of data mining and analysis, OLAP, or other similar programs so that such tools can receives all the data they needs from the ODS (without impeding database quality of service performance).

Figure 14:
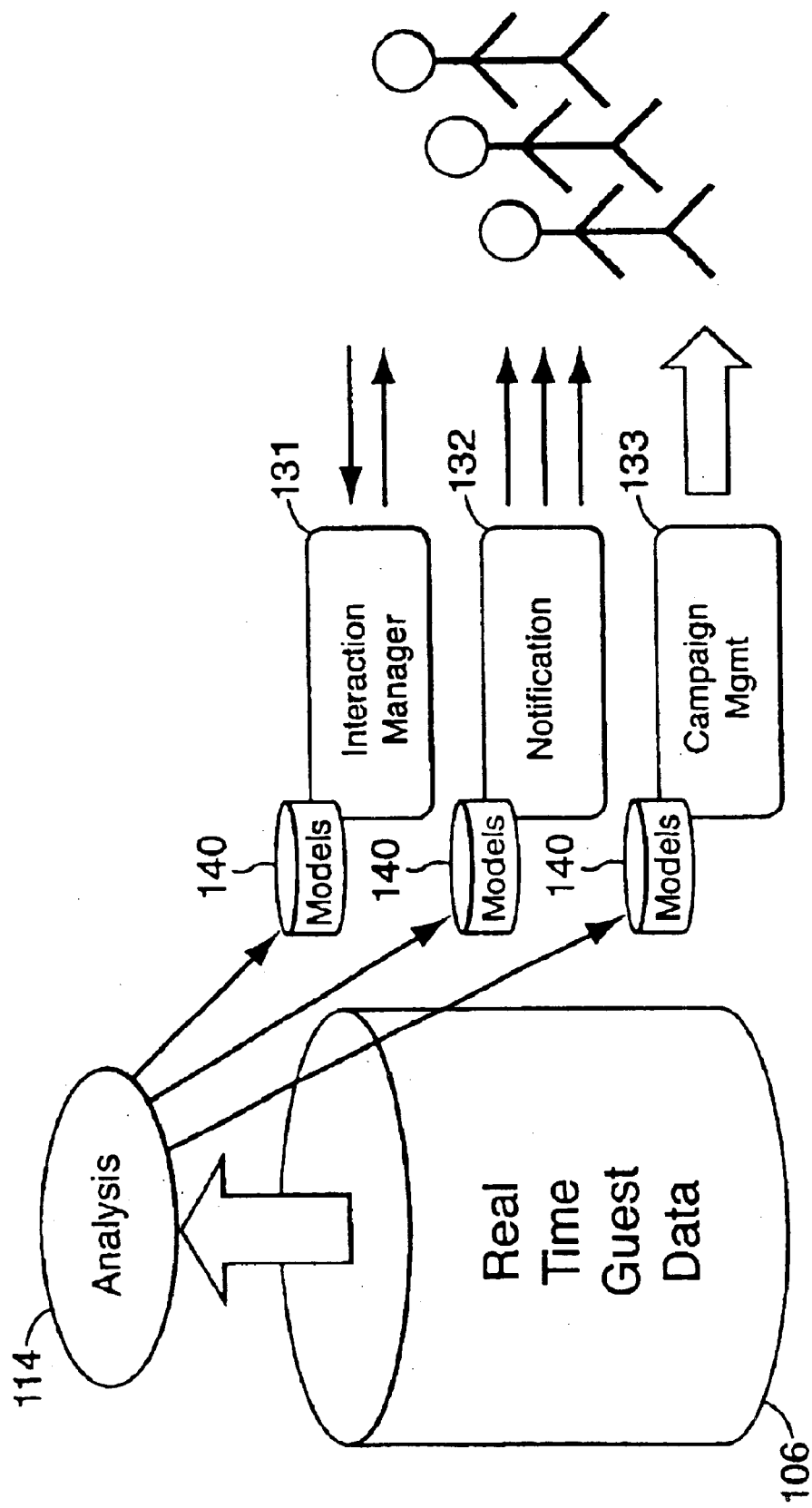
FIG. 14 shows bulk data (e.g., real-time customer data) retrieved and delivered from the operatinal data store (ODS) to the analysis applications.

Data mining, OLAP, and other knowledge discovery applications leverage the data contained within the ZLE core for enterprise intelligence purposes. Such applications subsequently feed back knowledge in the form of actionable models into the ZLE framework. As shown in FIG. 14, bulk data (e.g., real-time customer data) is retrieved and delivered from the ODS 106 to the analysis applications 114 via the ETL service (not shown here). An analysis program can produce result models 140 based on information gleaned from the data; and such models can be delivered as feedback to the unified rules service of the ZLE core. For example, based on buying habits and purchase history, which can be used to guide future interactions, an analysis program can create a result model that extrapolates for any customer (or group of customers) the customer's (or customers') likely future purchases. It is also possible to directly query the ODS through an open interface such as SQL, Open Database Connectivity (ODBC) or Java Database Connectivity (JDBC) when this is the preferred access method.

Extending the ZLE Architecture

The ZLE core architecture cannot exist in a vacuum; and be able to evolve with changes in the business environment of the enterprise. To integrate or interface with a wide variety of existing or new enterprise application environments, the ZLE architecture provides adapters (See, e.g., 110 & 112 FIG. 9). The adapters enable normalized messaging for exchanges among standard applications (such as SAP, PeopleSoft, popular Web server applications, and so on) as well as exchanges with custom applications. There are other architectural and functional requirements that the adapters support, including allowing, for example, legacy environments and diverse databases to join the ZLE framework. Additionally, the ZLE architecture should be able to easily interface and share data with enterprise intelligence systems (also termed business intelligence systems). These are systems that can retrieve information from the ODS, perform data analysis, fcreate result models, and then feed them back to create new business rules. For example, a customer's likelihood to buy a product can be measured and used to inform a business rule governing future interactions with that individual.

Enterprise applications are standalone, third-party enterprise applications that are loosely coupled to the ZLE core, the clip-on applications and other third party enterprise application (or ISV solutions). When so interfaced, an enterprise application becomes a logical part of the ZLE framework and shares that data with all the other applications through its ODS.

Docking Applications to the ZLE Framework

Third-party enterprise applications (specialized ISV solutions), such as PeopleSoft, SAP's ERP or Siebel's CRM applications, can "dock" on the ZLE core via adapters, which are available for Tuxedo-based, CORBA-based or Java-based ZLE, MOM (message oriented middleware) and like platforms. As mentioned, these applications differ from the tightly coupled clip-on applications in that they can exist alone, without the benefit of the ZLE framework. However, their value is increased immensely by integration with the framework. In some cases, these applications are the "end-consumers" of the ZLE architecture. In others, they provide much of its fodder in the form of information and specialized procedures of the enterprise. Typically, as they integrate or interface via the ZLE framework with other applications and systems across the enterprise they play both roles—i.e., taking and providing information in real time.

In this embodiment, docking enterprise applications can fall into two categories: interfaced solutions and integrated solutions. Interfaced solutions use industry-standard adapters and can publish an event to the ZLE framework or apply such event from the ZLE framework back to the application. These applications are relatively passive and noninvasive to the overall ZLE framework. Integrated solutions can be custom-made to directly utilize ZLE core services via a request-response model. These applications are specialized within the overall ZLE framework.

Figure 15:
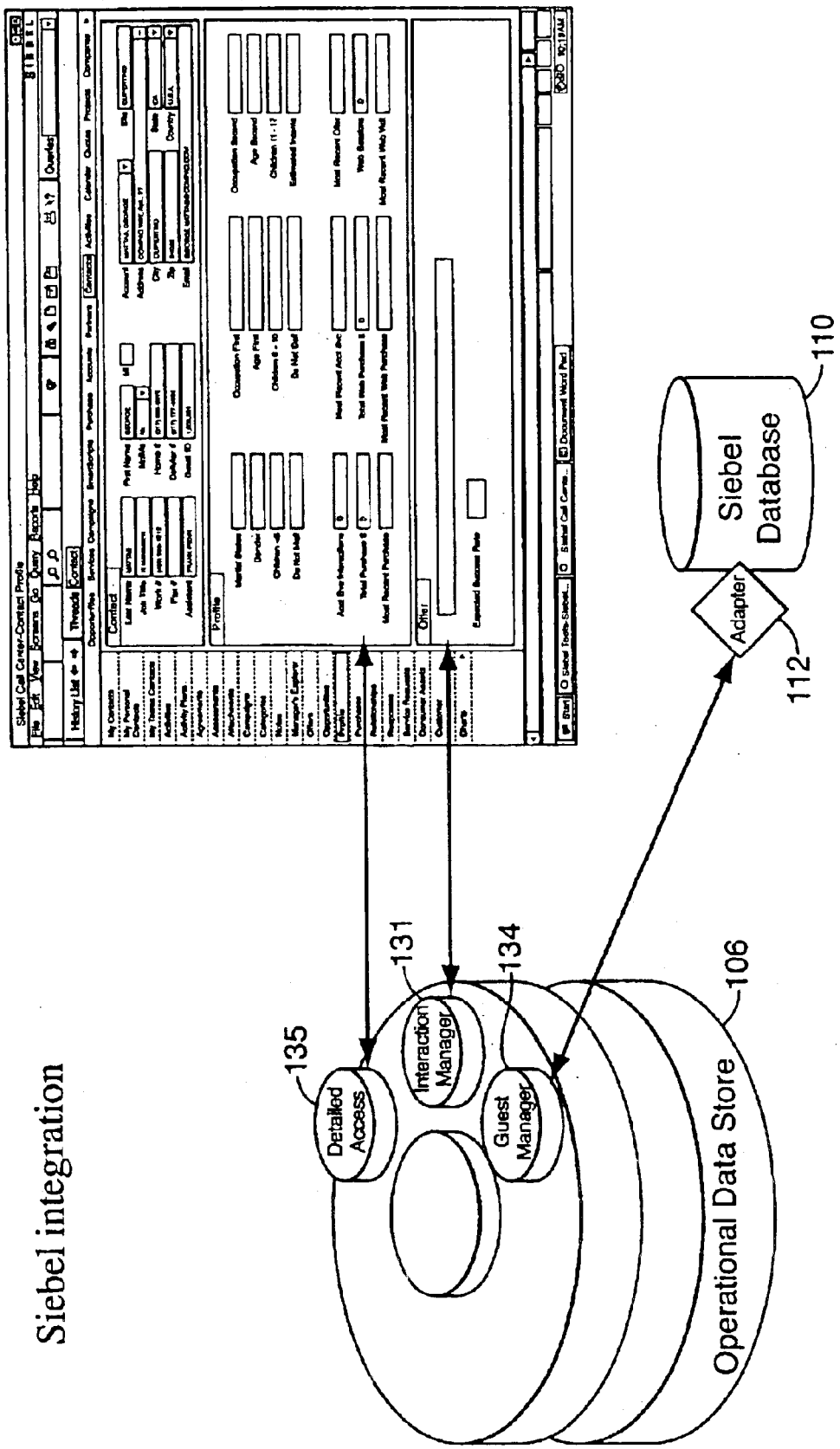
FIG. 15 illustrates applications such as Broadvision or Siebel's CRM (customer relationship management) applications that are logically integrated into (docked) rather than being interfaced with the ZLE framework.

Applications such as Broadvision or Siebel's CRM applications that are designed for customer information management, can be more readily logically integrated into rather than being interfaced with the ZLE framework (See, e.g., FIG. 15). Hence they are able to contribute significant value to as well as receive significant value from the ZLE framework. For example, Siebel's CRM application benefits from the unified rules service and the ODS of the ZLE core and, by the same token, it enhances the support of data mining and analysis applications in the ZLE framework.

ZLE Adapters

ZLE adapters tie enterprise applications to the ZLE framework. Their job is the traditional EAI job of mapping any proprietary application program interface (API) to the native APIs and protocols (CORBA, Java, or Tuxedo) of the ZLE framework. In most cases, the adapter resides on the application platform and not on the ZLE core platform. Typically also, three types of adapters are used: application, data and technology. The application adapters are typically either ready-made, fast, thin adapters for Oracle, PeopleSoft, SAP' ERP, Siebel's CRM, and other applications, or they are custom adapters created with development kits for custom and legacy applications. Data adapters interface directly to a data source like a file or database. Technology adapters are essentially gateways to disparate transaction or messaging environments such as IBM CICS MQSeries (CICS is customer information control system). Application and custom adapters from Actional Corporation normalize messaging between the ZLE core and enterprise applications, be it standard, packaged or custom applications. Technology adapters enable interoperability with legacy environments (such as IBM's CICS—i.e., customer interface control systems, and Compaq's Pathway), databases, Web server application, and so on.

While application adapters interface with existing APIs, data and technology adapters are used to pull data directly from an IBM MQSeries message queue or an Oracle database table. Application adapters can be constructed so that no modifications are required to the target transaction monitor or database and so that all security mechanisms can stay intact. Some adapters are targeted for interchange of data with business networks, such as S.W.I.F.T. for financial business, Healthnet or HL7 for healthcare business, and more.

ZLE Framework in Operation

The ZLE framework supports application and data integration and fashions unique hybrid functionality. This section presents some examples of how application and data integration work together in the ZLE framework in real time in the real world. EAI tools typically perform message functions, while database and application servers are in charge of transactions and data functions. The ZLE framework merges both as well as other functions that are unique to the ZLE framework.

The ZLE framework is designed to perform numerous functions in support of an enterprise business. Here is how it handles some of these functions in various business scenarios.

Messaging Functionality

Messaging functions in the ZLE framework may involve a simple messaging scenario of an EAI-type request-response situation in which a call-center application requests information on a particular customer from a remote billing application. The call-center application issues a Tuxedo call that the transformation service in the ZLE core maps to a Tuxedo call for communicating with the remote application. Billing information flows back to the call center through a messaging infrastructure.

Another scenario might involve publish and subscribe, that also involves the EAI function. In that scenario, several applications subscribe to the ZLE framework, asking for specific information whenever a certain event occurs. These applications could be Web server, call center, or fraud detection applications in search of changes in a consumer's credit status; or they could be electronic catalog or supply chain applications dependent on receiving the most current inventory status. When the event takes place, an adapter publishes the change to the ZLE framework, which then formats the messages correctly and pushes them to the subscribing applications, where they are filtered through the application adapters.

A more advanced scenario requires message routing. Here the rules and workflow services of the ZLE core intervene to determine where particular messages must be routed based on content and predefined workflow process.

Data Functions

As mentioned above, data functions in the ZLE framework, particularly those of the ODS, include but are not limited to only one of the functions such as real-time data warehouse or OLTP applications built on an RDBMS and application server. The ODS is optimized, via the ETL service of the ZLE core, for extracting, aggregating, and then moving large bulk data to analysis applications, data marts, and more. While not necessarily optimized for large volumes of ad hoc queries, the ODS make available its granular, real-time data to such queries, when necessary. For example, the ODS can be open to queries when there is no aggregate database available to answer a one-time business intelligence or decision support query, or when a query requires a data relationship that is denormalized when other business systems are loaded.

In a simpler scenario, access to information in the ZLE framework by OLTP or enterprise intelligence applications is supported via standard ODBC or JDBC calls from a remote system to the ODS. Similarly, an OLTP application (such as a Tuxedo application) can reside on the ZLE core platform to directly access the ODS with SQL statement and distribute data to its clients via CORBA, Java or Tuxedo mechanisms.

Hybrid Functionality

The ZLE framework achieves its unique qualities through its hybrid functionality. The ZLE framework combines the EAI, RDBMS (ODS) transaction processing and monitoring, data mining and analysis and feedback to form its hybrid functionality. And each of these elements offers unique functionality as described herein. For example, the ZLE architecture supports cached request-response functionality in which responses from applications are cached to the ODS as they occur (i.e., the ODS receives and stores real-time responses). These responses can be inventory-level changes, current account balances, etc. The requesting application draws the responses from the ODS, not directly from the remote application. Consequently, the dependencies between the requesting and responding applications are largely removed. And so, the responding application can go down, but current or near-current information is still available in the ODS for continuous operation. For example, on the subsequent failure of a corresponding application, customers can still get answers or supply chain applications stay current because the responses have previously been cached in the ODS. Moreover, changes made to the data can be supplied to the ODS and stacked on reliable queues to be applied to the responding system, when it becomes available. In other words, with the ODS at the ZLE core the enterprise can achieve its availability attribute even in the face of failing information production applications.

The ZLE framework also supports database publish and subscribe. That is, data can be published to the ODS, for example, in an XML message, for formatting and insertion into a database table. It can then be routed out of the ODS to multiple subscriber systems. In this way, the innate parallelism, scalability, and reliability of the database can be leveraged, along with its management capabilities, to ensure an efficient flow of subscriber messages. Of course, the current information contained in the database tables is also available for ad hoc querying or for bulk shipment to analytic applications, data marts, and so on. Other publish and subscribe products on the market contain a data store for the queues, but they are not relational. And, unlike the ZLE architecture, they do not allow the end user to access these data stores through standard SQL syntax or change the data through OLTP.

Return on Cache

Perhaps even more valuable is the ability of the ODS to cache data that can be used to enrich the messages—i.e., for request response or publish subscribe—that pass through the ZLE framework. For example, the response to a request for "last customer transaction" can be enriched by change of address or change of marital status information contained in the ODS as the response flows through the framework.

Similarly, information cached in the ODS for distribution to subscribers can pick up additional data that has been cached there by other systems. For example, a business-to-business customer wants to make an online purchase. As the ZLE architecture pulls together current inventory and pricing information, it can enrich it with personalized customer-specific data from its data store regarding special offers on related products—information that is invisible to the inventory system.

Addressing Platform Requirements

The ZLE framework presupposes a set of platform and technology attributes. By including these attributes in the ZLE framework, the vision of recognizing events in real time and triggering immediate, appropriate actions across the enterprise can be more readily realized.

As a basic attribute, the ZLE framework is capable of handling a comprehensive mix of data, messaging, and functionality. In addition to this challenging mix, the ZLE framework includes a robust application server functionality that is needed for strong transaction management. The ZLE framework is capable of supporting all leading transports and adapters. The ZLE framework is further capable of supporting parallel execution of functions because real-time operations start with real-time execution. For a real-time consolidated view of the enterprise business, the ZLE framework provides a single, manageable view of applications and data. Moreover, with inherent extensibility (e.g., scalability) and support for 24×7 operations, a ZLE framework can expand gracefully and provide the continuous operations that characterize a business-critical, revenue-enabling system.

To this end, the cluster platforms—NonStop™ Himalaya™ server or AlphaServe™ system running the Tru64™ UNIX™ operating system—are preferably chosen to provide parallel execution of key functions in order to ensure real-time operations. Moreover, the ability to support a single system image across multiple nodes is built into the NonStop™ Himalaya™ platform. The cluster architecture of these platforms and their associated database and application server environments enable their massive scalability, exceptional performance even under peak loads, and unrivaled availability for 24×7 operations.

Finally, the ZLE framework's open architecture enables core services and plug-in applications to be based on best-of-breed solutions from leading ISVs. This, in turn, ensures the strongest possible support for the full range of data, messaging, and hybrid demands.

In Summarry

The present invention contemplates enabling a ZLE that is all about competitive advantage. The ZLE framework keeps information from myriad enterprise systems refreshed, ready for consolidation, and available for real-time deployment in decision-making, CRM, inventory management, and marketing campaigns. The ZLE framework realizes this vision by creating an amalgamation of many functions to fashion hybrid functionality. This hybrid functionality allows the combining and hot-caching of information from across the enterprise in real time, as well as providing uniform rule-driven, workflow-informed architecture for the flow of information and breaking down performance dependencies between applications. This hybrid functionality also enables new types of applications that could not exist without real-time data and application integration.

The ZLE framework is designed to leverage best-of-the-breed tools into customized, integrated solutions for applications and data integration. The ability of the ZLE architecture to perform different types of functions and process different workloads in parallel and around the clock (24× 365), without the need for maintenance downtime—with the added functionality of clip-on applications from best-of-the-breed ISVs—is what unleashes the incredible business potential of any ZLE that builds the ZLE framework into their IT infrastructure.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A zero latency enterprise (ZLE) framework in an information technology infrastructure of an enterprise that conducts business transactions in relation to which the enterprise experiences a plurality of events occurring in sites across the enterprise, the ZLE framework comprising:
   enterprise applications installed in relation to respective sites across the enterprise;
   enterprise application platform configured for enterprise applications integration and propagation of indicia of the events across the enterprise, in real time;
   dynamic central repository configured for real-time loads, extractions, updates and queries, the dynamic central repository aggregating information related, in real time, to the plurality of events, a real-time access to the dynamic central repository being correspondingly available to the enterprise applications so that a real time coherent view of the aggregated information is available to the enterprise applications from across the enterprise via the dynamic central repository; and
   a server executing and monitoring transactions related to the business transactions, the dynamic central repository being operatively connected to the server so that the business transactions can be conducted across the enterprise with reduced latencies.

2. The ZLE framework of claim 1 enabling the enterprise to run as a ZLE.

3. The ZLE framework of claim 1 being extensible and available and enabling the enterprise to become extensible and available.

4. A zero latency enterprise (ZLE) framework in an information technology infrastructure of an enterprise that conducts business transactions in relation to which the enterprise experiences a plurality of events occurring in sites across the enterprise, the ZLE framework comprising:

- enterprise applications installed in relation to respective sites across the enterprise;
- enterprise application integration technology configured as a platform for integrating the enterprise applications and propagating indicia of the events across the enterprise, in real time;
- dynamic central repository configured as a dynamic real-time operational data store (ODS) with a relational database management system (RDBMS) for real-time loads, extractions, updates and queries, the dynamic central repository aggregating information related, in real time, to the plurality of events, a real-time access to the dynamic central repository being correspondingly available to the enterprise applications so that a real time coherent view of the aggregated information is available to the enterprise applications from across the enterprise via the dynamic central repository;
- ZLE services coupled to the dynamic central repository and operatively connected with the enterprise applications;
- clip-on applications tightly coupled to the ZLE services; and
- a server executing and monitoring transactions related to the business transactions, the server being operatively connected to the dynamic central repository so that the business transactions can be conducted across the enterprise with reduced latencies.

5. The ZLE framework of claim 4 enabling the enterprise to run as a ZLE.

6. The ZLE framework of claim 4 being extensible and available and enabling the enterprise to become extensible and available.

7. The ZLE framework of claim 4 defining a multilevel architecture with a hub, wherein the dynamic central repository and ZLE services reside on top of the server at the hub, and the enterprise applications are loosely coupled to the hub and communicating therewith via adapters.

8. A system in an information technology infrastructure of an enterprise that conducts business transactions in relation to which the enterprise experiences a plurality of events occurring in sites across the enterprise, the system for enabling the enterprise to run as a zero latency enterprise (ZLE), the system comprising:

- enterprise applications installed in relation to respective sites across the enterprise;
- a ZLE core configured with
- enterprise applications integration and propagation of information related to the events across the enterprise,
- dynamic central repository configured with dynamic real-time data warehouse and database management access to which being correspondingly available to the enterprise applications and through which a real time coherent view of the information is available to the enterprise applications from across the enterprise,
- ZLE services coupled with the dynamic central repository and operatively connected with the enterprise applications,
- transaction processing and monitoring relative to the dynamic central repository so that the business transactions can be conducted across the enterprise with reduced latencies;
- clip-on applications tightly coupled to the ZLE core; and
- data mining and analysis technology operatively connected to the dynamic central repository.

9. The system of claim 8 enabling the enterprise to run as a ZLE.

10. The system of claim 8 being extensible and available and enabling the enterprise to become extensible and available.

11. The system of claim 8 having a multilevel architecture in which the enterprise applications and loosely coupled to the ZLE core via corresponding adapters.

12. The system of claim 8, wherein the information is associated with indicia of the events, the system being configured for capturing and processing the indicia in real time.

13. The system of claim 8, wherein the system is configured for real-time recognition of the events, and wherein the system is configured for gathering the information related with the events from the sites across the enterprise.

14. The system of claim 8, wherein the information includes real-time event data, business transaction state data, and lookup data.

15. The system of claim 8 in which the dynamic real-time data warehouse and database management is implemented at the ZLE core in an operational data store (ODS) with a relational data base management system (RDBMS).

16. The system of claim 15 in which the ODS with the RDBMS is optimized for the enterprise application integration as well as real-time loads, extractions, updates and queries.

17. The system of claim 15 in which the information can be indexed by customer identification rather than by time.

18. The system of claim 8 in which the dynamic real-time data warehouse and database management is configured for dynamic data caching, historical data caching, message storage and state engine, and real-time data warehousing.

19. The system of claim 18, wherein the message storage is configured for use in publish and subscribe operations.

20. The system of claim 18, wherein the state engine is configured for maintaining real-time synchronization with the business transactions, the state engine supporting workflow management and allowing state tracking of ongoing business transactions.

21. The system of claim 20, wherein the state tracking of ongoing business transactions includes tracking of a value through production and delivery by the enterprise, and wherein the system allows the enterprise to produce and deliver the value more efficiently.

22. The system of claim 18, wherein the real-time data warehousing provides data to data marts and to the data mining and analysis.

23. The system of claim 8 wherein the dynamic real-time data warehouse and database management reduces data dependency between the enterprise applications.

24. The system of claim 8 to which new enterprise application can be added, wherein the dynamic real-time data warehouse and database management provides a historic account of events that can be used by the newly added enterprise application.

25. The system of claim 8 in which the transaction processing and monitoring at the ZLE core is implemented in a server environment that includes a server or a server cluster.

26. The system of claim 15, wherein the ODS with the RDBMS is cluster aware.

27. The system of claim 25, wherein the server environment is configured for real-time transaction management.

28. The system of claim 25, wherein the server environment is configured for fault tolerance, parallel processing, support of concurrent transaction processing and monitoring of transactions flow through the system.

29. The system of claim 25, wherein server environment provides an application server environment as a common, standard-based framework for interfacing with the enterprise applications, thereby proving transactional integrity.

30. The system of claim 25, wherein the server environment provides a higher level of system extensibility, system availability and data integrity.

31. The system of claim 25, wherein the server environment resides on a NonStop™ Hymalaya™ server cluster platform based on Tuxedo Corba or Java technologies for optimized interoperability.

32. The system of claim 25, wherein the server environment resides on an AlphaServer™ server cluster platform running True64™ UNIX operating system based on Tuxedo Corba or Java technologies for optimized interoperability.

33. The system of claim 25 in which the ZLE services at the ZLE core reside on top of a parallel processing platform for the transaction processing and monitoring of the server environment.

34. The system of claim 8 in which the ZLE services at the ZLE core include a rules service, a workflow service, a message transformation service, a parallel message routing and parallel database insertion service, an event capture service, and an extraction, transformation and load service.

35. The system of claim 8, wherein there is synergy between the ZLE services such that the ZLE services can operate as one.

36. The system of claim 34, wherein the dynamic real-time data warehouse and database management is implemented in an operational data store (ODS) with a relational database management system (RDBMS), and wherein the parallel message routing and database insertion service provides content based routing and facilitates use of the ODS with the RDBMS as a centralized message store and queuing system for efficient publish and subscribe message operations.

37. The system of claim 34, wherein the parallel message routing and database insertion service is configured for routing via components of the ZLE core rather than moving messages directly between the enterprise applications, the parallel message routing and database insertion service being further configured for loading large volumes of messages on the dynamic real-time data warehouse and database management at the ZLE core.

38. The system of claim 34, wherein the rules service is configured to apply a rule that is most applicable and to create a corresponding answer, in real time relative to the occurrence of an event, the application of the rules being uniform across the enterprise.

39. The system of claim 34 further including a user interface, wherein the rules service enables creation and modification of business rules via the user interface.

40. The system of claim 34 in which the rules service creates an enterprise-wide uniform rule-driven platform for flow of any business transaction information.

41. The system of claim 34 further comprising an inference-based rules engine, wherein the clip-on applications include an interaction manager around which the inference-based rules engine is wrapped, the inference-based rules engine being configured to find, in real time, a rule that is most appropriate regardless of the complexity of the rule or the size of rules set, the inference-based rules engine being further configured for non-sequential and non-iterative capability.

42. The system of claim 41 wherein the interaction manager includes middleware configured for parallel execution and connectivity automation rather than building point-to-point links between the enterprise applications.

43. The system of claim 34, wherein the rules service is configured for aggregating rules by the dynamic central repository at the ZLE core.

44. The system of claim 34, wherein the dynamic real-time data warehouse and database management is implemented at the ZLE core with a state engine, and wherein the workflow service is configured to leverage the state engine for managing the flow and processing of the business transactions via the system and to provide a real-time view of ongoing business transactions state from across the enterprise.

45. The system of claim 34, wherein the message transformation service at the ZLE core is configured for mapping differences in message syntax, semantics and values in order to assimilate diverse data between disparate message sources and destinations.

46. The system of claim 34, wherein the extraction, transformation and load service at the ZLE core is configured for bulk data handling capability.

47. The system of claim 34, wherein the event capture service is configured for capturing events from across the enterprise in real time.

48. The system of claim 8 in which the ZLE core is a virtual hub for the clip-on applications that are served by its ZLE services.

49. The system of claim 8, wherein the business transactions are associated with enterprise business wherein the clip-on applications are configured for supplementing the ZLE services in providing a business-level functionality that leverages the ZLE core and customizes it for the enterprise business.

50. The system of claim 34, wherein the clip-on applications are configured for providing real time fraud detection that uses the rules service at the ZLE core.

51. The system of claim 8, wherein the clip-on applications include an interaction manager, a narrowcaster, a campaign manager and a customer data manager.

52. The system of claim 34, wherein the dynamic real-time data warehouse and database management at the ZLE core is implemented in an operational data store (ODS) with a relational database management system (RDBMS), and wherein the data mining and analysis is configured for retrieving bulk data from the ODS and leveraging the bulk data for a rule-based analysis and enterprise intelligence, the data mining and analysis being capable of creating models that can be delivered to the ZLE core and ODS and, as feedback, to any of the ZLE services or clip-on applications.

53. The system of claim 8 further comprising a docking capability for docking additional enterprise applications.

54. The system of claim 8 further comprising adapters through which the enterprise applications, being loosely coupled and logically connected to the ZLE core, can interface with each other via the ZLE core.

55. The system of claim 54, wherein each of the adapters is configured for interfaced solutions or integrated solutions.

56. The system of claim 8 configured to enable integration, in real time, of enterprise-wide information, enterprise applications, business transactions and values.

57. A system in an information technology infrastructure of an enterprise that conducts business transactions in relation to which the enterprise experiences a plurality of events occurring in sites across the enterprise, the system for enabling the enterprise to run as a zero latency enterprise (ZLE), the system comprising:

means for instantiating enterprise applications installed in relation to respective sites across the enterprise;

a ZLE core configured with
- means for instantiating enterprise applications integration and propagation of information related to the events across the enterprise,
- means for central dynamic real-time warehousing and database management access to which being correspondingly available to the enterprise applications and through which a real time coherent view of the information is available to the enterprise applications from across the enterprise,
- means for instantiating ZLE services coupled with the means for central dynamic real-time warehousing and database management and operatively connected with the enterprise applications,
- means for transaction processing and monitoring relative to the central dynamic real-time warehousing and database management so that the business transactions can be conducted across the enterprise with reduced latencies;

means for instantiating clip-on applications which are tightly coupled to the ZLE core; means for data mining and analysis that is operatively connected to the means for dynamic central warehousing; and means for feeding back to the ZLE services results of the data mining and analysis and of data queries.

58. A method for reducing latencies of business transactions conducted by an enterprise in an information technology (IT) infrastructure of the enterprise in relation to which the enterprise experiences a plurality of events occurring at sites across the enterprise, the reduced latencies for enabling the enterprise to run as a zero latency enterprise (ZLE), the method comprising:

instantiating enterprise applications installed in relation to respective sites across the enterprise;

at a ZLE core within the IT infrastructure
- instantiating enterprise applications integration and propagation of information related to the events across the enterprise,
- creating dynamic central repository configured with central dynamic real-time warehousing and database management access to which being correspondingly available to the enterprise applications and through which a real time coherent view of the information is available to the enterprise applications from across the enterprise,
- instantiating ZLE services that are coupled with the dynamic central repository and are operatively connected with the enterprise applications,
- creating transaction processing and monitoring relative to the dynamic central repository so that the business transactions can be conducted across the enterprise with reduced latencies;

instantiating clip-on applications which are tightly coupled to the ZLE core; and instantiating data mining and analysis that is operatively connected to the dynamic central repository and providing feedback to the ZLE services.

59. The ZLE framework of claim 4 being used as an integrated uniform multi-channel customer relationship manager.

60. The ZLE framework of claim 4 being used as an integrated internal business operation optimization and enterprise-wide view mechanism.

61. The ZLE framework of claim 4 being used as an integrated supply chian management and optimization mechanism.

62. The ZLE framework of claim 4 being used as a dashboard for viewing, in real-time, a global status of any information relevant to the enterprise business.

* * * * *

UNITED STATES PATENT AND TRADEMARK OFFICE
CERTIFICATE OF CORRECTION

PATENT NO.        : 6,954,757 B2  
APPLICATION NO.   : 09/948927  
DATED             : October 11, 2005  
INVENTOR(S)       : Bahman Zargham et al.

Page 1 of 1

It is certified that error appears in the above-identified patent and that said Letters Patent is hereby corrected as shown below:

In column 30, line 30, in Claim 61, delete "chian" and insert -- chain --, therefor.

Signed and Sealed this

Fourth Day of August, 2009

JOHN DOLL  
*Acting Director of the United States Patent and Trademark Office*